United States Patent
Mei et al.

(10) Patent No.: US 11,651,169 B2
(45) Date of Patent: May 16, 2023

(54) TAG SYSTEM WITH A MODULATOR OF AN ANTENNA MODULATOR AND METHODS OF USE

(71) Applicant: Palo Alto Research Center Incorporated, Palo Alto, CA (US)

(72) Inventors: Ping Mei, San Jose, CA (US); Sean Doris, San Francisco, CA (US); Janos Veres, San Jose, CA (US); Robert Anthony Street, Palo Alto, CA (US)

(73) Assignee: XEROX CORPORATION, Norwalk, CT (US)

( * ) Notice: Subject to any disclaimer, the term of this patent is extended or adjusted under 35 U.S.C. 154(b) by 210 days.

(21) Appl. No.: 17/226,349

(22) Filed: Apr. 9, 2021

(65) Prior Publication Data
US 2022/0327295 A1    Oct. 13, 2022

(51) Int. Cl.
G06K 7/10     (2006.01)
G08B 13/24    (2006.01)

(52) U.S. Cl.
CPC ..... *G06K 7/10128* (2013.01); *G06K 7/10148* (2013.01); *G08B 13/246* (2013.01); *G08B 13/2448* (2013.01)

(58) Field of Classification Search
CPC .......... G06K 7/10128; G06K 7/10148; G08B 13/2448; G08B 12/246
USPC .......................................... 340/572
See application file for complete search history.

(56) References Cited

U.S. PATENT DOCUMENTS

| | | | |
|---|---|---|---|
| 10,628,725 B1 * | 4/2020 | Mei ............. | G06K 19/07309 |
| 2004/0070502 A1 * | 4/2004 | Tyren ............ | G08B 13/2437 340/572.6 |
| 2005/0242955 A1 * | 11/2005 | Lian ............. | G08B 13/2417 340/572.6 |
| 2020/0342280 A1 * | 10/2020 | Mei ............. | G06K 19/07701 |

\* cited by examiner

*Primary Examiner* — Kerri L McNally
(74) *Attorney, Agent, or Firm* — Fox Rothschild LLP

(57) ABSTRACT

Systems and methods for operating a tag system. The methods comprising: emitting a wireless signal from an antenna of the tag with a first signal characteristic when the tag is proximate to an active antenna modulation marker; changing an impedance of a sensor from a first impedance value to a second impedance value when the active antenna modulation marker is exposed to a stimulus; and emitting a wireless signal from the antenna of the tag with a second signal characteristic when the tag is proximate to the active antenna modulation marker and the sensor has the second impedance value.

22 Claims, 28 Drawing Sheets

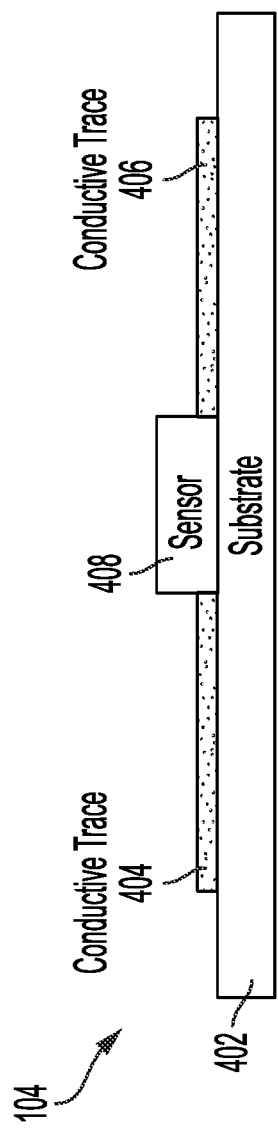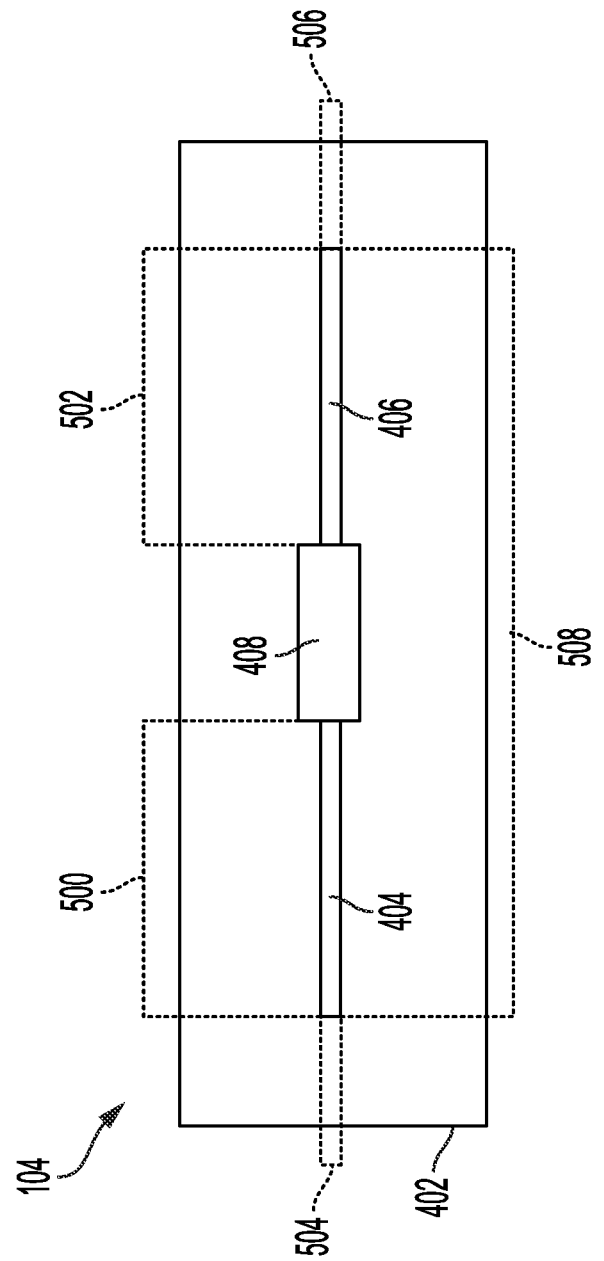

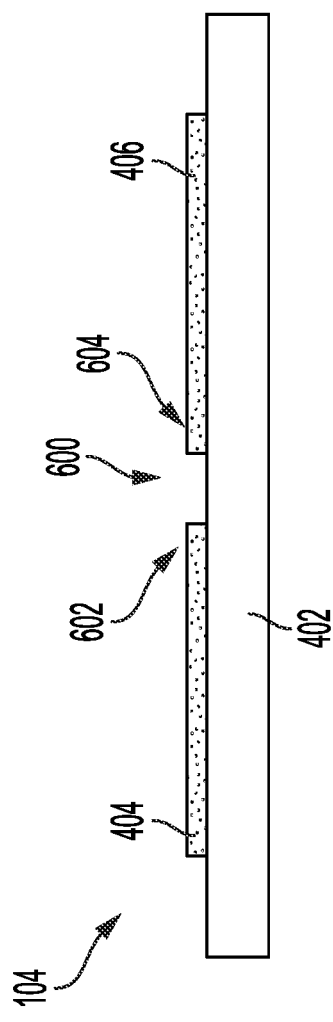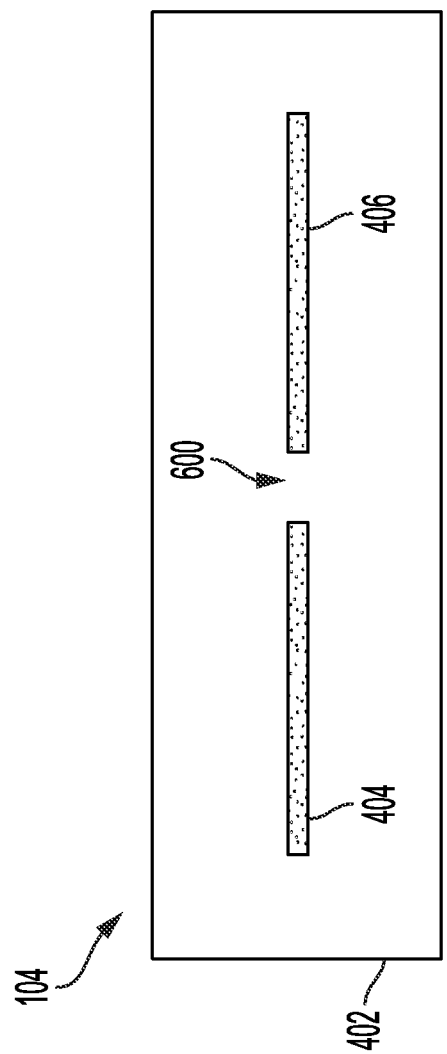

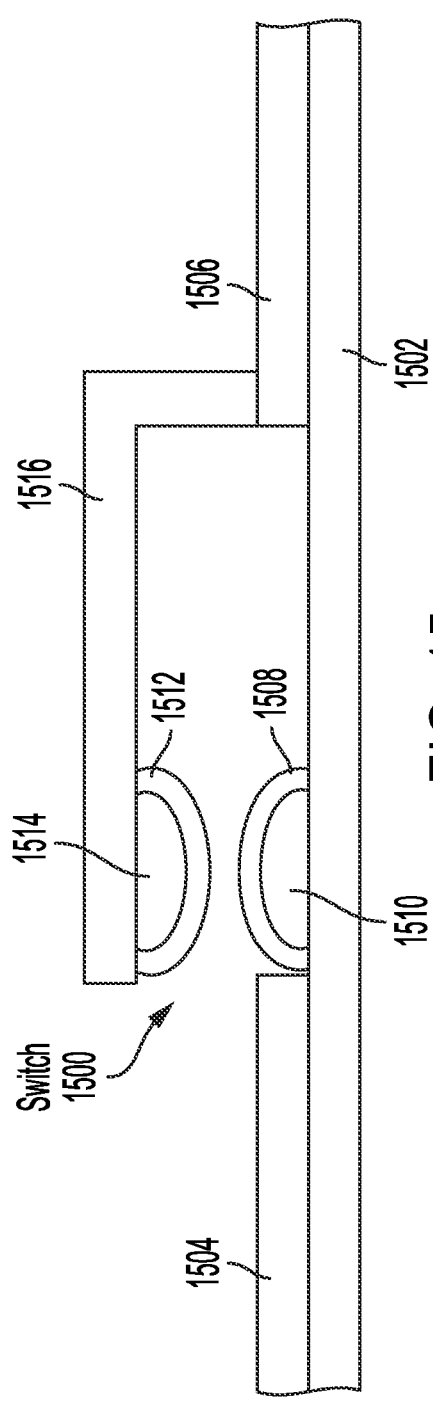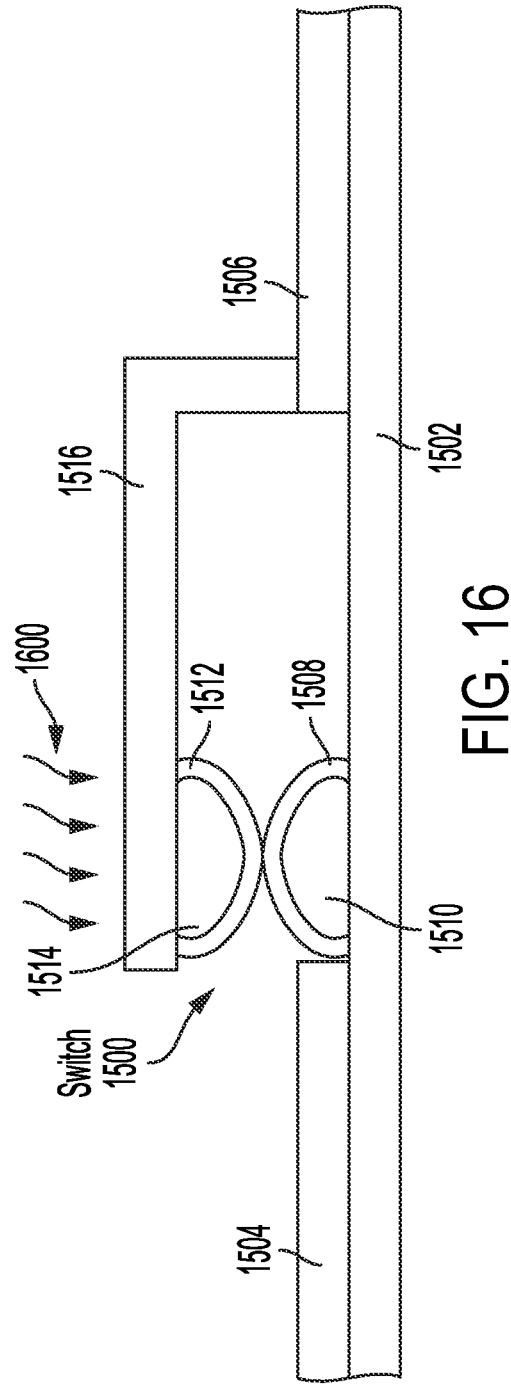

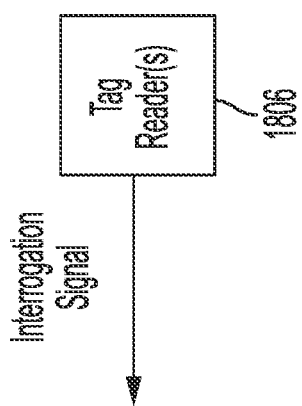
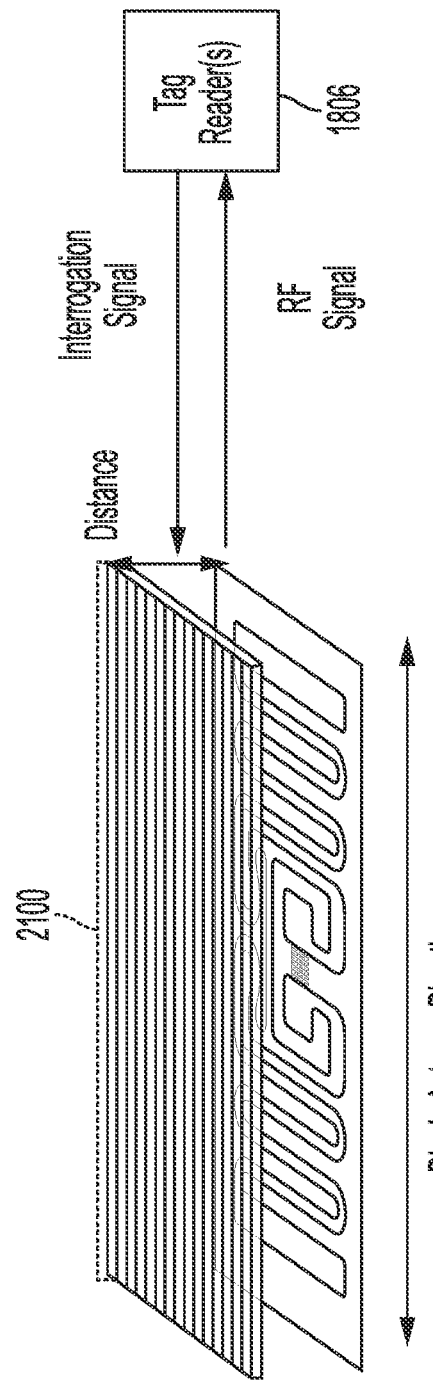

TAG SYSTEM WITH A MODULATOR OF AN ANTENNA MODULATOR AND METHODS OF USE

BACKGROUND

The present disclosure relates generally to tag systems and methods of use. In the conventional art, Radio Frequency Identification (RFID) has been broadly used for item identification. However, for a Point Of Sale (POS) application, it is difficult to tell (i) whether the item with an RFID tag is on a shelf or has been taken off the shelf but still in the vicinity of the same and/or (ii) whether the item has experienced any change in state. Information (ii) is of particular importance when the item is perishable.

SUMMARY

The present disclosure concerns implementing tag systems and methods for operating a tag system. The methods comprise: emitting a wireless signal from an antenna of the tag with a first signal characteristic when the tag is proximate to an active antenna modulation marker having first and second conductive traces disposed on a substrate and connected to a sensor having a first impedance value; changing an impedance of the sensor from the first impedance value to a second impedance value when the active antenna modulation marker is exposed to a stimulus; emitting a wireless signal from the antenna of the tag with a second signal characteristic when the tag is proximate to the active antenna modulation marker and the sensor has the second impedance value; and/or emitting a wireless signal from the antenna of the tag with a third signal characteristic when the tag is not proximate to the active antenna modulation marker. The second signal characteristic is different from the first signal characteristic. The first signal characteristic, second signal characteristic and/or third signal characteristic can include, but is(are) not limited to, a frequency spectrum, a back-scattered amplitude, a signal phase or a signal polarization. In some scenarios, the three signal characteristic are different frequency spectrums, different back-scattered amplitudes, different signal phases or different signal polarizations. The stimulus can include, but is not limited to, a change in temperature, a change in moisture, a change in a pH level, a change in pressure, a change in ambient light, a chemical, and/or vibration. Adjacent ends of the first and second conductive traces may be interdigitated.

In some scenarios, the sensor is disposed on the substrate between the first and second conductive traces. The sensor is responsive to the stimulus by closing a gap between the first and second conductive traces to form a low impedance electrical connection. The sensor can include, but is not limited to, an electrochemical cell, a piezoelectric sensor, a thermistor, a MEMS switch, and/or a photo-conductor. In this regard, the sensor may have a voltage that changes in response to the stimulus. Additionally or alternatively, the sensor comprises two electrodes and a sensing material disposed adjacent at least one of the two electrodes. A volume of the sensing material is expandable in response to the stimulus so as to cause the two electrodes to come in contact with each other. Additionally or alternatively, the sensor comprises an elongated conductive member connected to the first conductive trace and cantilevered over the second conductive trace by a sensing material. The sensing material changes from a solid to a liquid in response to the stimulus so as to cause the elongated conductive member to come in contact with the second conductive trace.

The present disclosure concerns implementing systems and methods for operating a tag system. The methods comprise: emitting a wireless signal from an antenna of a tag at a first signal characteristic when a sensor of an active antenna modulation marker is sensing a stimulus; and emitting a wireless signal from the antenna of the tag with a second signal characteristic when the sensor of the active antenna modulation marker no longer senses the stimulus. The second signal characteristic is different from the first signal characteristic. The first signal characteristic and/or second signal characteristic can include, but is not limited to, a frequency spectrum, a back-scattered amplitude, a signal phase or a signal polarization.

In some scenarios, the implementing tag systems comprise: a tag reader; a tag comprising an antenna and an antenna modulation marker proximate to the antenna. The active antenna modulation marker comprises first and second conductive traces disposed on a substrate connected by a sensor with an impedance responsive to a stimulus for selectively modulating a communications behavior of the tag's antenna. The tag is configured to: wirelessly communicate a first signal with a first signal characteristic when the sensor is in a high impedance state when exposed to a first stimulus or an absent stimulus; and wirelessly communicate a second signal with a second signal characteristic when the sensor is in a low impedance state when exposed to a second stimulus that is stronger than the first stimulus, changing the impedance between the first and second conductive traces in response to the second stimulus. The first signal characteristic and/or second signal characteristic can include, but is not limited to, a frequency spectrum, a back-scattered amplitude, a signal phase or a signal polarization. The second signal characteristic is different from the first signal characteristic. None or one of the first and second signal characteristics can result in a signal being unreadable by the tag reader.

In those or other scenarios, the implementing tag systems comprise: a tag reader; a tag comprising an antenna; and an active antenna modulation marker that is disposed adjacent to the tag and comprises a sensor configured to sense a stimulus. The tag is configured to: wirelessly communicate a signal with a first signal characteristic when the sensor of the active antenna modulation marker is sensing the stimulus; and wirelessly communicate a signal with a second signal characteristic when the sensor of the active antenna modulation marker no longer senses the stimulus. The first signal characteristic and/or second signal characteristic can include, but is not limited to, a frequency spectrum, a back-scattered amplitude, a signal phase or a signal polarization. The second signal characteristic is different from the first signal characteristic.

BRIEF DESCRIPTION OF THE DRAWINGS

The present solution will be described with reference to the following drawing figures, in which like numerals represent like items throughout the figures.

FIGS. 4-10 provide illustrations of illustrative architecture for active antenna modulation markers.

FIGS. 11-16 provide illustrations of illustrative switches actuated by changes in a surrounding environment.

FIGS. 23-24 provide illustrations that are useful for understanding operations of the tag system shown in FIGS. 18-22.

DETAILED DESCRIPTION

Figure 1:
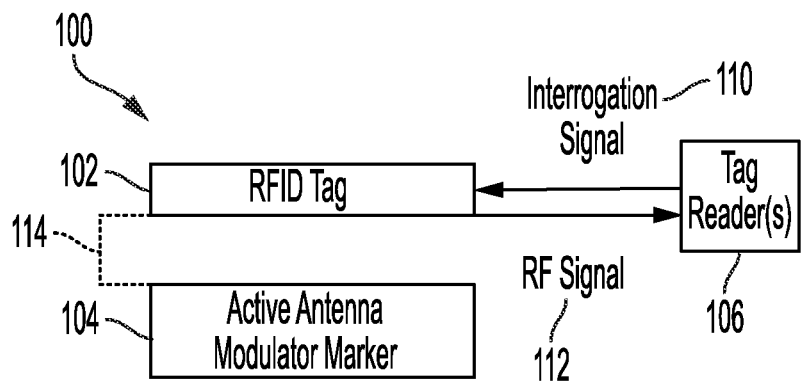
FIGS. 1-3 provide illustrations of an illustrative tag system for detecting changes in states of a surrounding environment and/or condition of an item or object.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present solution may be embodied in other specific forms without departing from its spirit or essential characteristics. The described embodiments are to be considered in all respects only as illustrative and not restrictive. The scope of the present solution is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present solution should be or are in any single embodiment of the present solution. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One skilled in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

Reference throughout this specification to "one embodiment", "an embodiment", or similar language means that a particular feature, structure, or characteristic described in connection with the indicated embodiment is included in at least one embodiment of the present solution. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

In many applications (e.g., cold chain item tracking, security authentication and/or environmental monitoring applications), there is a need for low power, low cost, wireless sensors to track and provide information about current states and past states of the wireless sensors without batteries. Chromic sensors have been used to provide information about past states via changes in color of compounds. A change in a compound's color can be stimulated by temperature changes (e.g., heat) and/or light irradiation. However, chromic sensors require line of sight optical reading, which may not be possible in many situations.

The present solution generally concerns tag systems that are able to (i) provide information about current state(s) and past state(s) of a surrounding environment and/or item/object, and/or (ii) detect the presence and location of the item/object in a given area (e.g., on a shelf). Information (i) is obtained using a normal-on antenna and an active antenna modulation marker. Information (ii) is obtained using a normal-on antenna and a passive antenna modulation marker. The particulars of the normal-on antennas, active antenna modulation marker and passive antenna modulation marker will become evident as the discussion progresses.

In some scenarios, the tag systems comprise tags that wirelessly communicate with a tag reader. The tags include, but are not limited to, Radio Frequency Identification (RFID) tags, Near Field Communication (NFC) tags, and/or Bluetooth enabled tags. Each tag generally comprises an antenna, a substrate and a communication circuit capable of transmitting and receiving wireless signals. The tags are normally-on tags, meaning that they wirelessly communicate with the tag reader unless disabled. Active and passive antenna modulation markers can be used to selectively disable the tags as described below. Each active modulation marker comprises conductive traces disposed on a substrate and electrically connected to a sensor (e.g., a switch). Each passive antenna modulation marker comprises one or more conductive or semi-conductive traces disposed on a substrate. The tag readers can be mobile tag readers or fixed tag readers strategically placed in a facility (e.g., in a ceiling, on or below a shelf of a display equipment, or as part of a POS checkout counter).

A first tag can be disabled when (i) in proximity to an active antenna modulation marker and (ii) a sensor of the active antenna modulation marker has an impedance change or a switch has been closed via a stimuli (e.g., a change in temperature, a change in humidity, a change in an amount of light, etc.). The active antenna modulation marker does not engage with the antenna of the first tag when the sensor has a first impedance or the switch is open or has a high impedance. However, the active antenna modulation marker does engage with the antenna of the first tag when the sensor has a second different impedance or the switch is closed or has a low impedance. As such, the wireless communications from the first tag are not disabled when the first tag is in proximity to the active antenna modulation marker and either the sensor has the first impedance or the switch is in an open position. In contrast, the wireless communications from the first tag are disabled when the first tag is in proximity to the active antenna modulation marker and either the sensor has the second impedance or the switch is in a closed position. In this way, the system can obtain information about current state(s) and past state(s) of a surrounding environment and/or item/object, and/or detect the presence of the item/object at a particular location. For example, the active antenna modulation marker is mounted to the bottom of an item/object. When the item is placed on an array of tags which are mounted on a surface of a shelf, the tag which resides under the active antenna modulation marker stop responding to interrogation signals sent from the tag reader when a change in the surrounding environment occurs. The present solution is not limited to the particulars of this example.

A second tag can be disabled when proximate to a passive antenna modulation marker since the passive antenna modulation marker engages with the antenna of the second tag at this time. Accordingly, wireless communications from the second tag are disabled when the second tag is in proximity to the passive antenna modulation marker. In this way, the presence and location of the item/object can also be detected. For example, the passive antenna modulation marker is formed of one or more conductive traces disposed on a substrate, and is mounted on the bottom of an item/object. When the item is placed on an array of tags which are mounted on a surface of a shelf, the tag which resides under the item/object will not respond to interrogation signals sent from the tag reader. Thus, the system can detect the presence of the item/object at a given location (e.g., on the shelf). The present solution is not limited to the particulars of this example.

During operation, the tag reader transmits an interrogation signal. The first and second tags respond to the interrogation signal in a detectable manner when they are not in proximity (e.g., not within 0-10 mm) to any antenna modulation markers. The first tag continues to respond to the interrogation signal in a detectable manner when it comes in proximity (e.g., within 0-10 mm) to an active antenna modulation marker with a sensor having the first impedance value or an open switch. The first tag stops responding to the interrogation signal in a detectable manner when the sensor of the proximate active antenna modulation marker has an impedance that transitions from the first impedance value to a second impedance value or the switch of the proximate active antenna modulation marker transitions from an open state/position to a closed state/position. The second tag does not respond to the interrogation signal in a detectable manner when it is in proximity (e.g., within 0-10 mm) to the passive antenna modulation marker.

The present solution has many advantages. For example, the present solution may provide a means to identify a relatively large number of objects or items using a single tag reader, more accurately determine locations of objects and items in a facility (e.g., on particular shelves or display equipment) using one or more tag readers, and/or more accurately track changes in states of the object and items in real-time or near real time.

The present solution can be used in many applications. These applications include, but are not limited to, POS applications, inventory applications, object tracking applications, and/or any other application in which an object's location needs to be determined. In addition, the solution enables user input wirelessly. The features of the present solution will become more evident as the discussion progresses.

The present solution will be described below in relation to RFID technology. The present solution is not limited in this regard. The present solution can be used with NFC technology, Bluetooth technology or other communication technologies in which modulation of tag communication characteristics is possible.

Illustrative Systems

Figure 2:
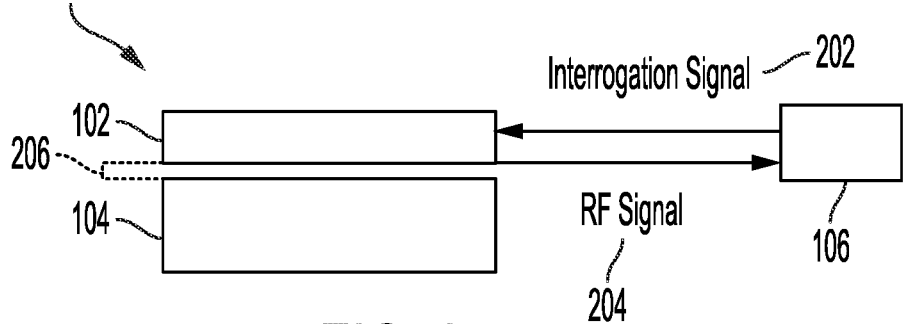
Figure 3:
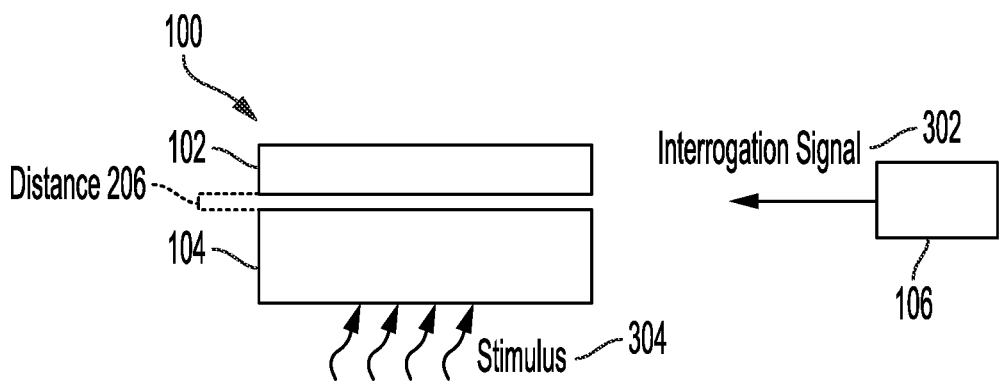

Referring now to FIGS. 1-3, there are provided schematic illustrations that are useful for understanding a tag system. RFID tags are well known in the art for marking and identifying items and objects. In many applications, it is desirable to detect and track changes in states of items and objects. This can be achieved using chromic sensors, which require line of sight optical reading that may not be possible in many situations. There is a need for a simpler and lower cost item/object state monitoring system.

It has been discovered that RFID tags can be turned into a part of an item/object identification system able to monitor state changes of items/objects by devising a novel RFID tag system. As shown in FIGS. 1-3, the novel RFID tag system 100 comprises at least one RFID tag 102 and at least one active antenna modulation marker 104. The active antenna modulation marker 104 generally comprises an active structure that can affect communication characteristics of a tag antenna whereby the output signal from the tag can be selectively modified. The RFID tag 102 may be applied to a first item and the active antenna modulation marker 104 is applied to a second item. For example, the first item comprises a part of infrastructure (e.g., a shelf of display equipment, a box, a wall, etc.), while the second item comprises a piece of merchandise. Alternatively, the first item comprises piece of merchandise, and the second item comprises a part of infrastructure. The present solution is not limited to the particulars of this example.

Notably, the RFID tag 102 communicates with a signal characteristic such as a frequency spectrum that does not allow the tag reader 106 to detect the signal when it is in proximity of (e.g., within 0-1 mm) or in contact with the active antenna modulation marker 104 which is in the presence of an external stimulus 302 (e.g., a change in temperature, a change in moisture, a change in pH level, a change in pressure, vibration, a change in an amount of light, and/or chemical exposure). This is shown in FIG. 3 where the RFID tag 102 either (1) rejects the interrogation signal 302 since it is outside of the tag's receive operational frequency range or (2) transmits an RF signal (not shown) in response to the interrogation signal 302 but the signal is not detected by the tag reader 106, when the RFID tag 102 is a relatively small distance 206 from, or perhaps even in physical contact with, the active antenna modulation marker 104 that is in an induced operational state induced by the external stimulus 302.

However, the RFID tag 102 communicates with a signal characteristic such as a frequency spectrum that allows the tag reader 106 to detect the signal when the tag is not in proximity (e.g., not within 0-1 mm) of the active antenna modulation marker 104. This is shown in FIG. 1 where the RFID tag 102 transmits an RF signal 112 that is received by the tag reader 106 since the RFID tag 102 is a larger distance 114 from the active antenna modulation marker 104.

The RFID tag 102 also communicates with a signal characteristic such as a frequency spectrum that allows the tag reader 106 to detect the signal when the tag is in proximity (e.g., within 0-1 mm) of the active antenna modulation marker 104 that is in a normal operational state (i.e., a state which is not induced by the external stimulus 302). This is shown in FIG. 2 where the RFID tag 102 transmits an RF signal 112 that is received by the tag reader 106 since the proximate active antenna modulation marker 104 is not being exposed to any stimulus.

Therefore, the behavior of the RFID tag 102 may be modulated when the tag in proximity with the active antenna modulation marker 104 that is being exposed to the stimulus 302. More specifically, the active antenna modulation marker actually causes the RFID tag to change its absorption and transmission signal spectrum when the active antenna modulation marker is in proximity to the RFID tag and an operational state change is being induced by an external stimulus. When the active antenna modulation marker is in proximity to the RFID tag and in the induced operational state, it effectively becomes part of the RFID tag's antenna so that the RFID tag's antenna emits a signal with a different signal characteristic such as a different frequency spectrum that does not allow the tag reader 106 to detect the signal or is recognized as a different frequency spectrum by the tag reader. Notably, the frequency spectrum is a function of signal frequency versus signal amplitude. The active antenna modulation marker 104 may modulate the communications behavior of the RFID tag 102, for example, by changing the tag's resonant frequency, enhancing an RFID signal's amplitude, shifting a phase of the RFID signal, and/or changing a polarization of a backscatter signal. Accordingly, the signal characteristic includes, but is not limited to, a frequency spectrum, a back-scattered amplitude, a signal phase, or a signal polarization.

Referring now to FIGS. 4-5, there are provided illustrations of an illustrative architecture for the active antenna modulation marker 104. FIG. 4 is a cross-section view. The active antenna modulation marker 104 comprises a substrate 402 with conductive traces 404, 406 disposed thereon. The substrate is formed of a dielectric material, such as plastics (e.g., PET, PEN, polyimide), paper or cardboard, fabrics, and/or glass with properties selected to affect the resonant frequency, impedance, gain, bandwidth, and/or radiation pattern of a tag antenna. These properties include, but are not limited to, a material type, a shape, a thickness (e.g., 1.0-5.0 mm) and a permittivity (e.g., dielectric constant 4.3). The active antenna modulation marker 104 can have any shape selected in accordance with a particular application. For example, the active antenna modulation marker 104 can be rectangular as shown, square, planar, and/or circular. The size of the active antenna modulation marker 104 is sufficiently large so that it can provide substantial overlap with the tag antenna when they are in proximity of and aligned with each other.

The conductive traces are disposed on the substrate 402 via an inkjet printing process or other deposition technique such as screen printing, gravure printing, aerosol jetting, and/or imprinting techniques. The conductive traces are formed of a conductive material, such as gold, silver, copper, and/or aluminum. In some scenarios, the conductive traces 404, 406 are linear lines with elongate lengths 500, 502 and widths 504, 506 (e.g., 1 um-5 mm), as illustrated in a planar view of FIG. 5. The dimensions 500-506 are selected such that the trace array at least partially covers an antenna of an RFID tag 102. The conductive traces 404, 406 are aligned with each other and are spaced apart from each other by a gap 600 as shown in FIGS. 6-7. The spacing between adjacent conductive traces is selected in accordance with a given application. The present solution is not limited to the linear line shapes and/or spacing shown in FIGS. 4-7 for the conductive traces. For example, in other scenarios, the conductive traces comprise concentric rings or serpentine lines.

Figure 8:
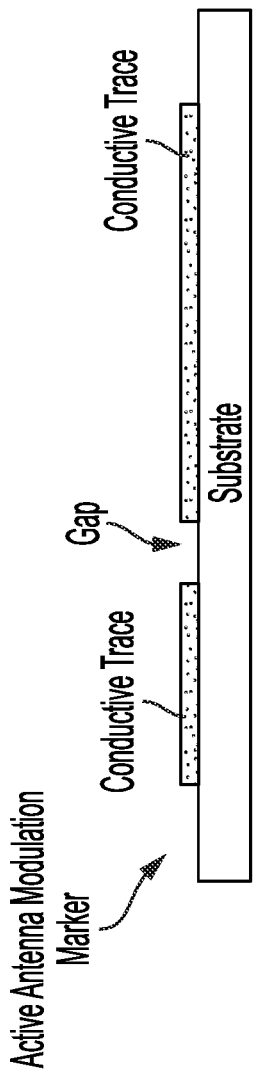
Figure 9:
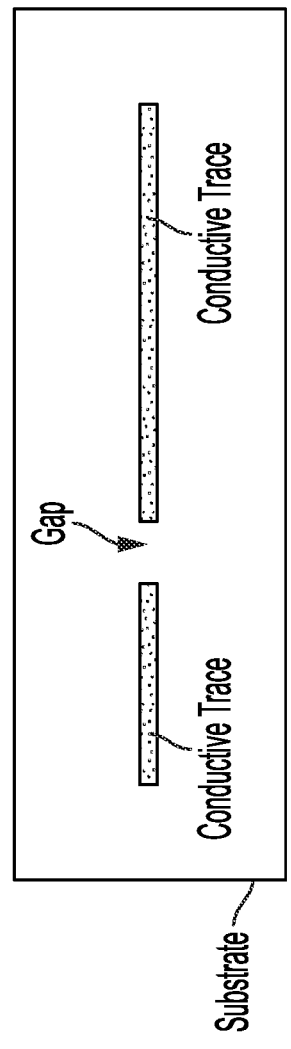

A single pair of conductive traces are shown in FIGS. 4-7. The present solution is not limited in this regard. The active antenna modulation marker 104 can include any number of conductive trace pairs in accordance with the given application (e.g., 1-N conductive traces). Also, the conductive traces 404, 406 can have the same dimensions as shown in FIGS. 4-7 or different dimensions (e.g., lengths, widths and/or heights) as shown in FIGS. 8-9. The conductive traces 404, 406 can also be formed of the same material or different material. The dimensions of the conductive traces, the materials of conductive traces, and/or the location of the gap along a collective length 508 of to the conductive traces is/are selected in accordance with a given application and/or to optimize performance of the system.

Figure 10:
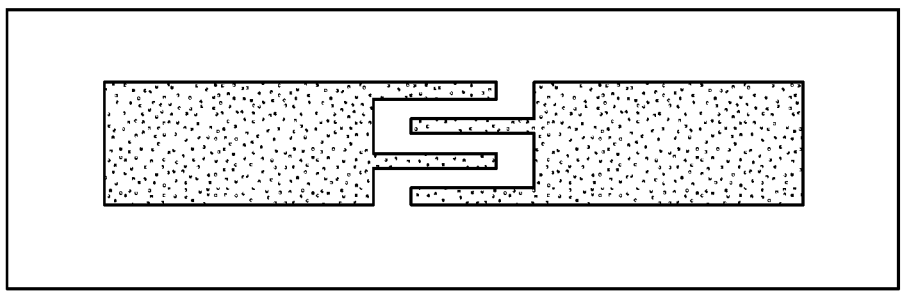

The present solution is further not limited to the particular shape of the adjacent ends 602, 604 of the conductive traces 404, 406 that is shown in FIGS. 6-7. In other scenario scenarios, the adjacent ends of the conductive traces may be inter-digitated as shown in FIG. 10.

A sensor 408 is provided to selectively close and/or open the gap 600 between the conductive traces 404, 406 (where closed means a low impedance and open means a high impedance). The sensor 408 is configured to act as a switch for selectively opening and/or closing the circuit comprising the pair of conductive traces 404, 406. The circuit is normally an open circuit, i.e., the gap 600 exists between the conductive traces 404, 406. The circuit is transitioned to a closed circuit when the sensor 408 is exposed to the stimulus 304 (e.g., a change in temperature, humidity, pH level, pressure, and/or light). The present solution is not limited in this regard. In other scenarios, the circuit is a normally closed circuit, and transitions to an open circuit when the sensor is exposed to a stimulus. The sensor 408 can include, but is not limited to, an electrochemical cell, a piezoelectric sensor, a thermistor, a MEMS switch and/or a photo-conductor. For example, the electrochemical cell can have a voltage that is temperature dependent. When the temperature is higher than a threshold, the voltage will lead to corrosion to a portion of the conductive trace of the active antenna modulation marker under an electrolyte and the active antenna modulation marker in an off state. The present solution is not limited to the particulars of this example. The sensor can alternatively or additionally include a sensing element with a voltage dependent on various physical and chemical stimuli.

A single sensor 408 is shown in FIGS. 4-5. The present solution is not limited in this regard. For example, a sensor can be provided for each conductive trace pair of an active antenna modulation marker. Additionally or alternatively, two or more sensors can be provided to close respective gaps of a plurality of gaps existing between two conductive traces of a given pair.

Figure 11:
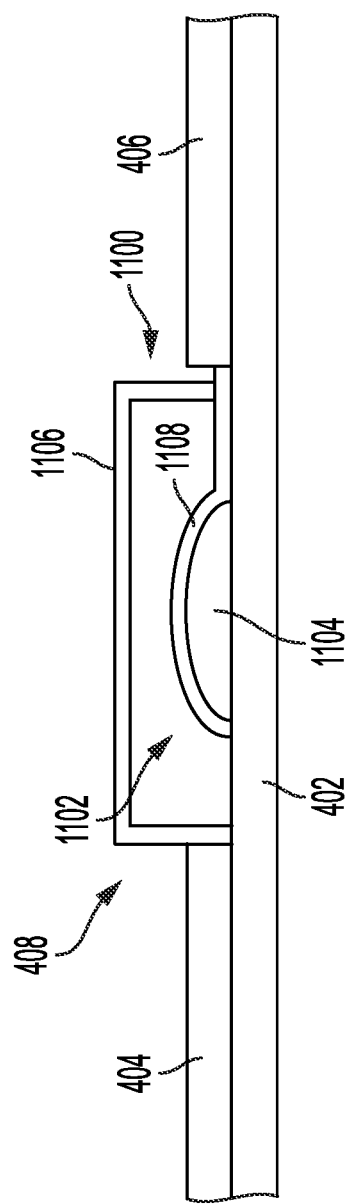
Figure 12:
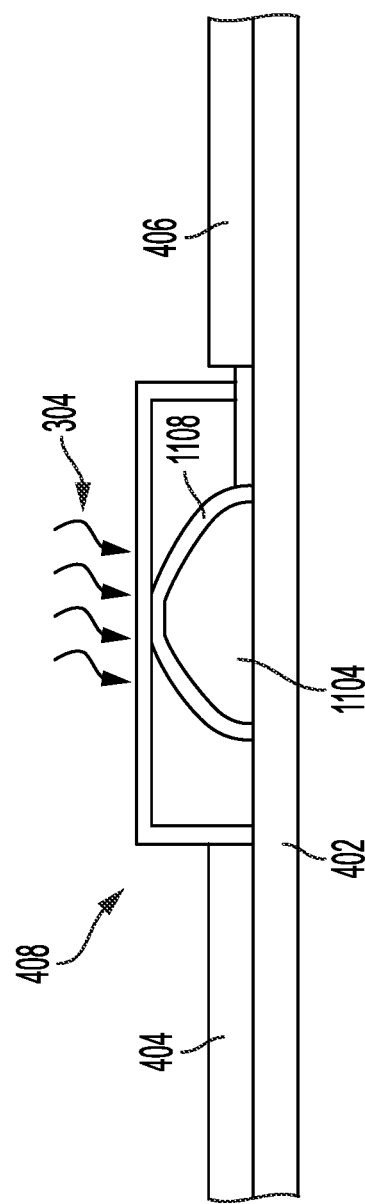

An illustrative architecture for the sensor 408 is provided in FIGS. 11-12. The architecture of FIGS. 11-12 can be implemented via MEMS technology. As shown in FIGS. 11-12, the sensor 408 comprises a first conductive structure 1100 electrically connected to conductive trace 404 and a second conductive structure 1102 electrically connected to conductive trace 406. At least a portion 1106 of the first conductive structure 1100 is resides above the at least a portion 1108 of the second conductive structure 1102. The first conductive structure 1100 is a rigid or semi-rigid structure, while the second conductive structure 1102 is at least partially a flexible structure that can be enlarged by an underlying material 1104, as shown in FIG. 12. The underlying material 1104 can include, but is not limited to, a polymer material, a rubber and/or a plastic that swells in response to the external stimulus 304 (e.g., a change in temperature and/or humidity). Portion 1108 of the second conductive structure 1102 enlarges when the material 1104 swells, whereby a closed circuit is formed.

The present solution is not limited to the particular sensor architecture shown in FIGS. 11-12. Sensor 408 can alternatively have another architecture such as those shown in FIGS. 13-14 or FIGS. 15-16. The architectures of FIGS. 13-14 and/or 15-16 can be implemented via MEMS technology.

Figure 13:
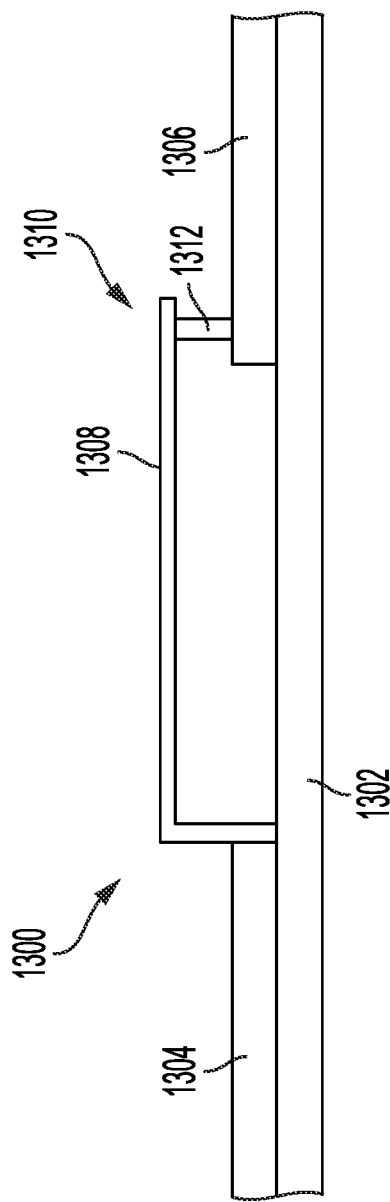
Figure 14:
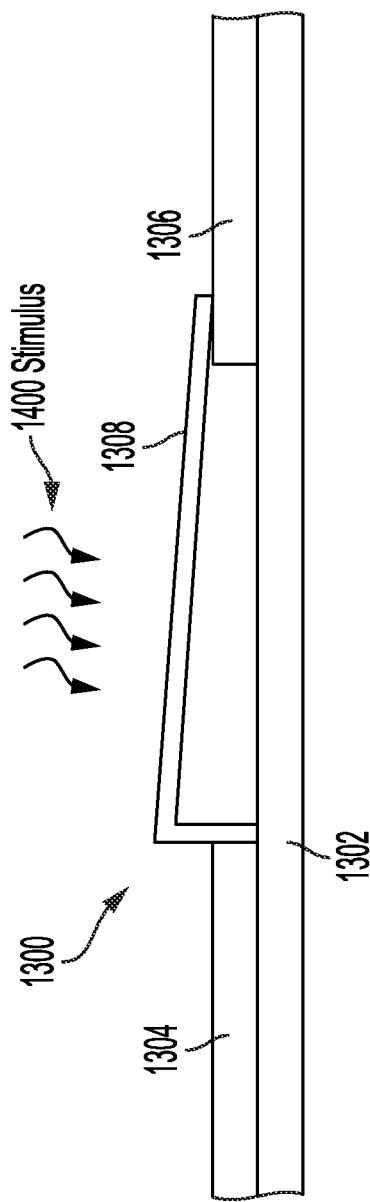

In FIGS. 13-14, the sensor architecture 1300 comprises a conductive element 1308 electrically connected to conductive trace 1304. An end 1310 of the conductive element 1308 is supported by a material 1312 that melts or dissolves when exposed to a stimulus 1400 (e.g., a change in temperature, humidity and/or light). The end 1310 drops down so as to come in contact with conductive element 1306 when this occurs, whereby a closed circuit is formed.

In FIGS. 15-16, the sensor architecture 1500 comprises a first conductive structure 1508 and a second conductive structure 1512. Both structures are the same as or similar to structure 1102 of FIGS. 11-12, i.e., each structure 1508, 1512 enlarges when an underlying material 1510, 1514 swells in response to a stimulus 1600. The first and second conductive structures contact each other when the materials 1510, 1514 are swollen as shown in FIG. 16. In effect, a gap between conductive traces 1504, 1506 is closed, whereby a closed circuit is formed.

The present solution is not limited to the vertically aligned arrangement of the first and second conductive structure 1508, 1512 shown in FIGS. 15-16. The first and second conductive structures can alternatively have a horizontally aligned arrangement relative to substrate 1502.

The active antenna modulation markers describe above have many advantages. For example, active antenna modulation markers are relatively inexpensive and easy to fabricate. The active antenna modulation markers may also be disposable, and provide a means to quickly and/or accurately detect items/objects with states that could cause harm a person (e.g., a spoiled perishable food item).

Figure 17:
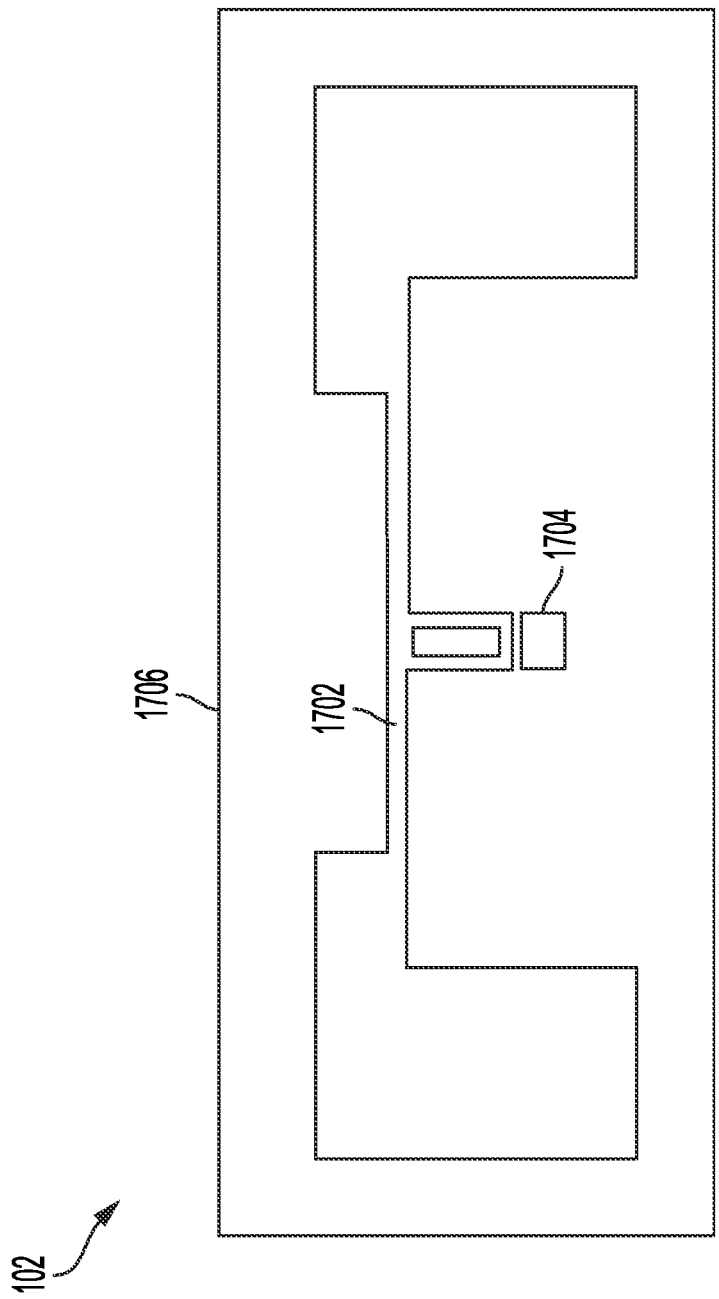
FIG. 17 provides an illustration of an illustrative architecture for an RFID tag.

Referring now to FIG. 17, there is an illustration of an illustrative architecture for the RFID tag 102. The RFID tag 102 is shown as comprising a passive tag. The present solution is not limited in this regard. In other scenarios, the RFID tag 102 comprises an active tag. Accordingly, RFID tag 102 can include more or less components than that shown in FIG. 17. However, the components shown are sufficient to disclose an illustrative embodiment implementing the present solution. Some or all of the components of the RFID tag 102 can be implemented in hardware, software and/or a combination of hardware and software. The hardware includes, but is not limited to, one or more electronic circuits. The electronic circuit(s) may comprise passive components (e.g., capacitors and resistors) and active components (e.g., processors) arranged and/or programmed to implement the methods disclosed herein.

The RFID tag 102 is configured for allowing data to be exchanged with an external device (e.g., tag reader 106 of FIG. 1) via wireless communication technology. The wireless communication technology can include, but is not limited to, RFID technology. RFID technology is well known in the art.

In general, a passive RFID tag 102 is comprised of three parts: antenna 1702 for receiving and transmitting information; an optional RFID Integrated Circuit (IC) chip 1704 for storing and processing information; and a substrate 1706. RFID IC chips are well known in the art. The IC chip 1704 controls communication to/from the RFID tag 102, and facilitates energy harvesting for the passive RFID tag 102. In this regard, it should be noted that the RFID tag 102 does not have an internal power supply. This RFID system relies on the exchange of power and information between the tag reader 106 and the tag 102. The tag reader provides power and communicates with the tag over an RF link. The tag communicates back to the tag reader with data by backscattering a signal from the tag reader.

As shown in FIG. 17, the IC chip 1704 is coupled to at least one antenna 1702 for allowing data to be exchanged with the external device via a wireless communication technology (e.g., an RFID technology). The antenna 1702 is configured to receive signals from the external device and/or transmit signals generated by the IC chip 1704. The performance of the antenna is mainly determined by the geometry design and the conductivity of the antenna, as well as the geometric and dielectric properties of the substrate 1706. In some scenarios, the antenna is a meander dipole path antenna made by printing techniques, such as inkjet, extrusion or screen printing. The antenna can also be made by stamping or laser cutting metal foil. The substrate can be selected from, but not limited to, polymer, PVC, Polyethylenetherephtalate (PET), phenolics, polyesters, styrene, paper, and PCB. The geometric size and shape of the antenna, the conductance and substrate properties (e.g., thickness and dielectric constant) are designed such that the antenna can provide a signal spectrum which can be detected in a tag reader's operation frequency range.

The antenna 1702 is designed to: facilitate communications at a first frequency spectrum when the antenna is in proximity (e.g., within 0-10 mm) of an active antenna modulation marker having stimulus exposure; and facilitate communications at a second frequency spectrum when the antenna is not in proximity (e.g., not within 0-10 mm) of the active antenna modulation marker or the antenna is in proximity of the active antenna modulation marker that does not have stimulus exposure. Therefore, the behavior of the tag 102 may be modulated when in proximity with an active antenna modulation marker having stimulus exposure. The active antenna modulation marker may modulate the behavior of the RFID tag 102, for example, by changing the tag's resonant frequency, attenuating an RFID signal's amplitude, shifting a phase of the RFID signal, and/or changing a polarization of a backscatter signal.

During operation, the IC chip 1704 processes received signals (e.g., RF signals) transmitted from external devices to determine whether it should transmit a response signal (e.g., RF carrier signal) to external devices or provide a backscatter response to the external device. In this way, the IC chip 1704 can optionally facilitate the locating of an item and/or the sensing of the item's condition as described below in relation to FIGS. 25-29.

Various information can be included in the response signal. This information includes, but is not limited to, item information and/or a unique ID. This information is stored in memory of the IC chip 1704. A timestamp may also be included in the response signal. The item information includes, but is not limited to, an item description, an item price, and/or a currency symbol.

Figure 18:
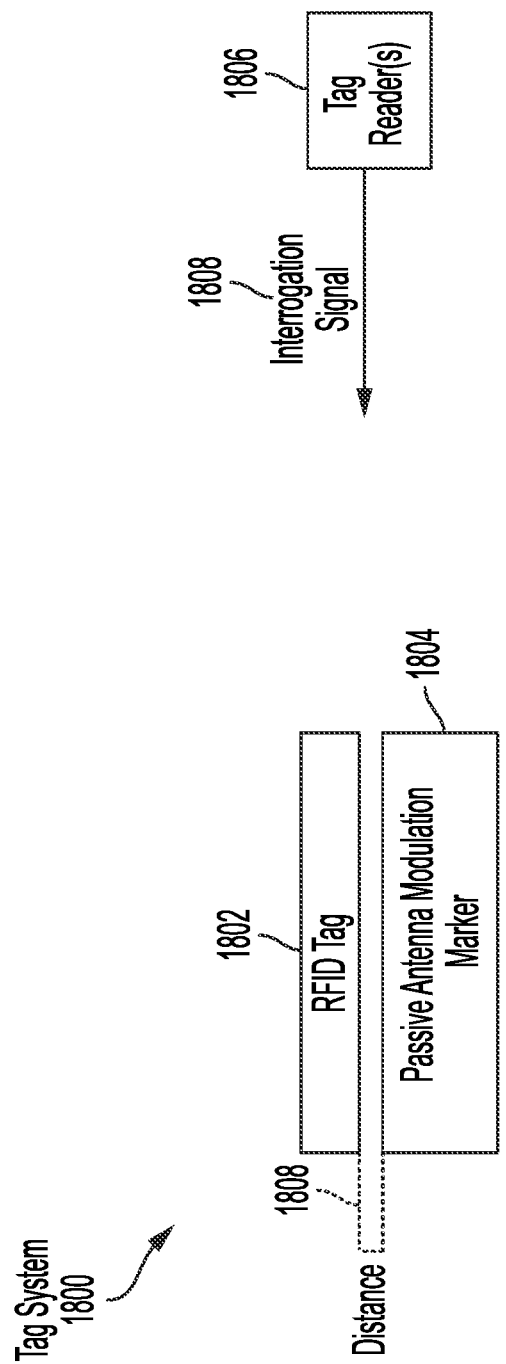
FIGS. 18-19 provide illustrations of another illustrative tag system for detecting the presence and location of an item or object.
Figure 19:
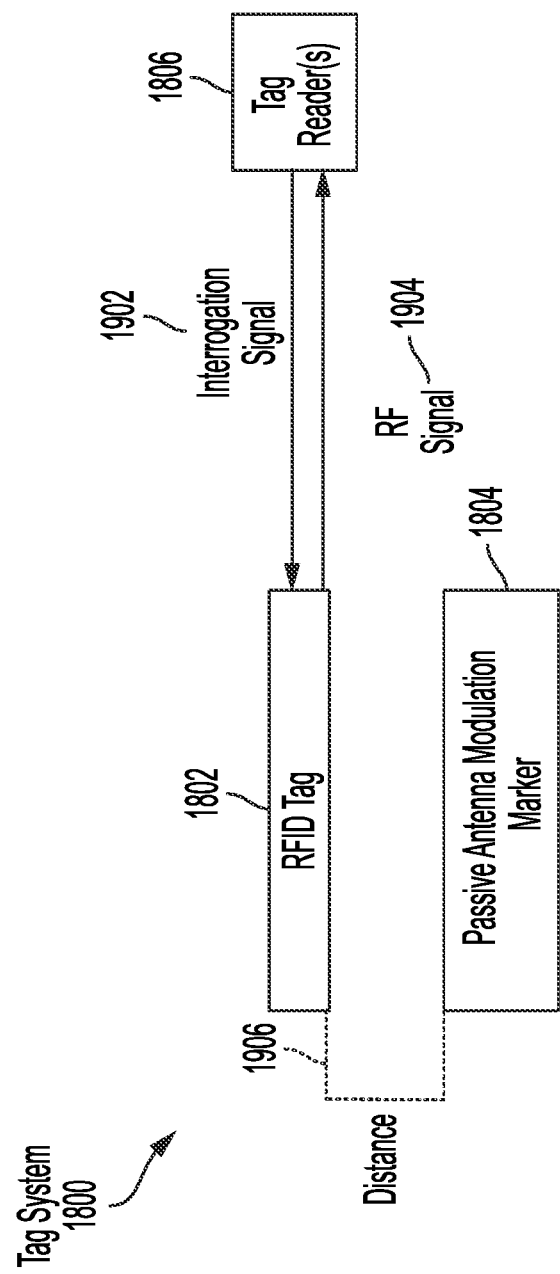

Referring now to FIGS. 18-19, there are provided schematic illustrations that are useful for understanding another RFID tag system 1800. RFID tag system 1800 is generally configured to determine or measure the exact location of objects with RFID tags (e.g., in real time or near real time). The RFID tag system 1800 comprises at least one RFID tag 1802 and at least one passive antenna modulation marker 1804. The passive antenna modulation marker generally comprises a passive structure having physical and material properties that affect communication characteristics of a tag antenna whereby the output signal from the tag is modified. The RFID tag 1802 is applied to a first item and the passive antenna modulation marker 104 is applied to a second item. For example, the first item comprises a piece of merchandise, while the second item comprises a part of infrastructure (e.g., a shelf of display equipment, a box, a wall, etc.). Alternatively, the first item comprises the infrastructure, and the second item comprises the merchandise. The present solution is not limited to the particulars of this example.

Notably, the RFID tag 1802 communicates at a frequency spectrum that does not allow the tag reader 1806 to detect the signal when it is in proximity of (e.g., within 0-1 mm) or in contact with the passive antenna modulation marker 1804. This is shown in FIGS. 18, 23 and 24 where the RFID tag 1802 either (1) rejects the interrogation signal 1808 since it is outside of the tag's receive operational frequency range or (2) transmits an RF signal (not shown) in response to the interrogation signal 1808 but the signal is not detected by the tag reader 1806, when the RFID tag 1802 is a relatively small distance 1808 from, or perhaps even in physical contact with, the passive antenna modulation marker 1804.

However, the RFID tag 1802 communicates at a frequency spectrum that allows the tag reader 1806 to detect the signal when the tag is not in proximity (e.g., not within 0-1 mm) of the passive antenna modulation marker 1804. This is shown in FIG. 19 where the RFID tag 1802 transmits an RF signal 1904 that is received by the tag reader 1806 since the RFID tag 1802 is a larger distance 1906 from the passive antenna modulation marker 1804.

Therefore, the behavior of the RFID tag 1802 may be modulated when the tag in proximity with the passive antenna modulation marker 1804. More specifically, the passive antenna modulation marker actually causes the RFID tag to change its absorption and transmission signal spectrum when in proximity thereto. When the tag modulation marker is in proximity to the RFID tag, it effectively becomes part of the RFID tag's antenna so that the RFID tag's antenna emits a signal at a different frequency spectrum that does not allow the tag reader 1806 to detect the signal or is recognized as a different frequency spectrum by the tag reader. Notably, the frequency spectrum is a function of signal frequency versus signal amplitude. The passive antenna modulation marker 1804 may modulate the communications behavior of the RFID tag 1802, for example, by changing the tag's resonant frequency, enhancing an RFID signal's amplitude, shifting a phase of the RFID signal, and/or changing a polarization of a backscatter signal.

Figure 20:
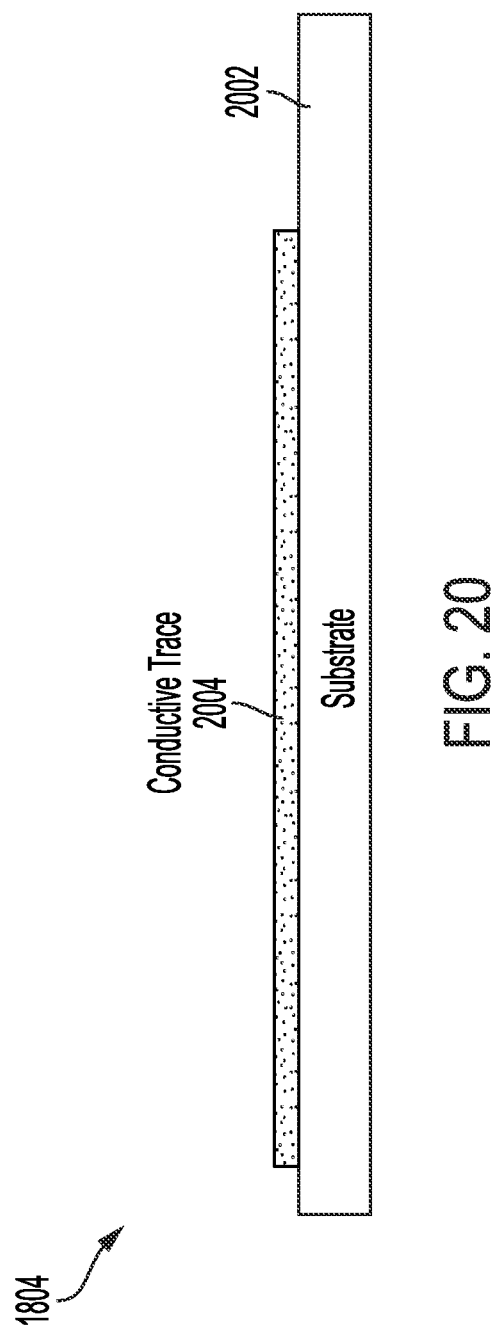
FIGS. 20-21 provide illustrations of an illustrative architecture for the passive antenna modulation marker shown in FIGS. 18-19.
Figure 21:
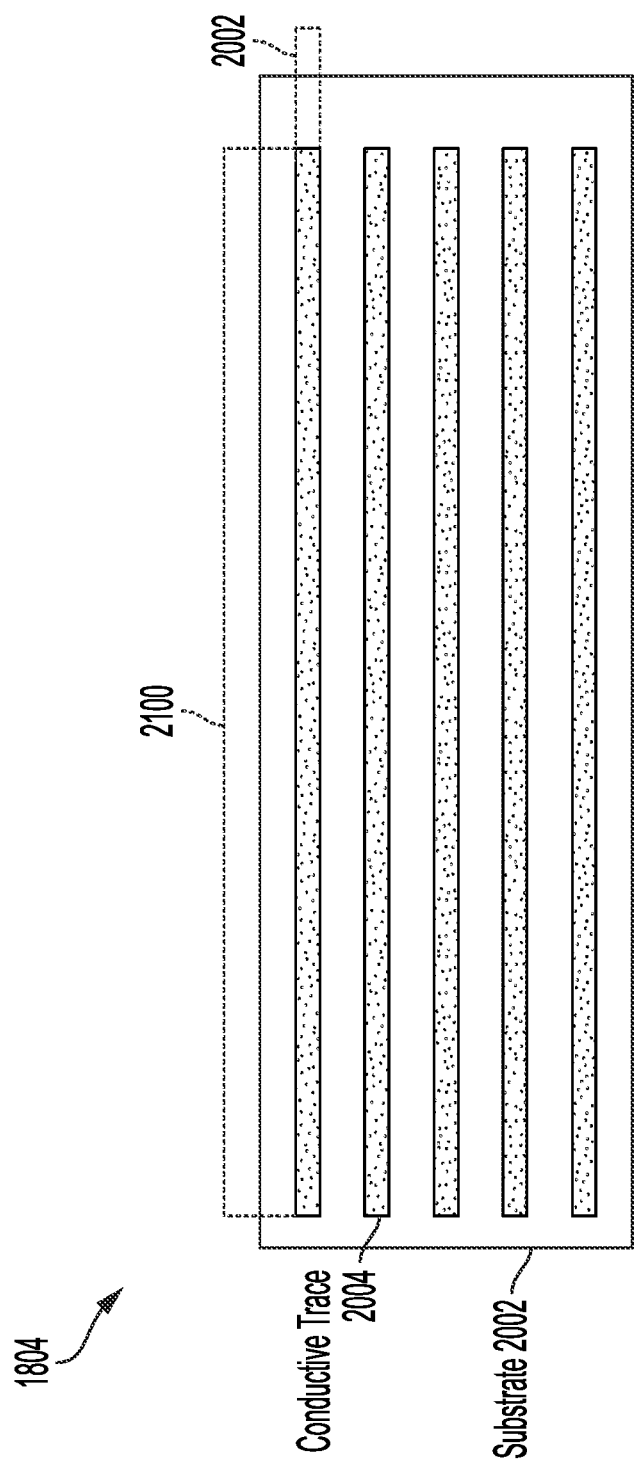

Referring now to FIGS. 20-21, there are provided illustrations of an illustrative architecture for the passive antenna modulation marker 1804. The passive antenna modulation marker 1804 comprises a substrate 2002 with a plurality of conductive traces 2004 disposed thereon. The substrate is formed of a dielectric material, such as plastics (e.g., PET, PEN, polyimide), paper or cardboard, fabrics, and/or glass with properties selected to affect the resonant frequency, impedance, gain, bandwidth, and/or radiation pattern of a tag antenna. These properties include, but are not limited to, a material type, a shape, a thickness (e.g., 1.0-5.0 mm) and a permittivity (e.g., dielectric constant 4.3). The passive antenna modulation marker 1804 can have any shape selected in accordance with a particular application. For example, the passive antenna modulation marker 1804 can be rectangular as shown, square, planar, and/or circular. The size of the passive antenna modulation marker 1804 is sufficiently large so that it can provide substantial overlap with the tag antenna when they are in proximity of and aligned with each other. In some scenarios, the substrate for the passive antenna modulation marker 1804 has a dielectric constant of 3-10. In a particular example, the passive antenna modulation marker 1804 is a PET sheet with a dielectric constant of ~3 and having a thickness of 0.05-0.2 mm. The present solution is not limited in this regard.

The conductive traces are disposed on the substrate 2002 via an inkjet printing process or other deposition technique such as screen printing, gravure printing, aerosol jetting, and/or imprinting techniques. The conductive traces are formed of a conductive material, such as silver. In some scenarios, the conductive traces 2004 are linear lines with elongate lengths 2100 and widths 2102 (e.g., 1 um-5 mm). In some scenarios, the dimensions 2100, 2102 are selected such that the trace array covers an antenna of an RFID tag 1802. The conductive traces 2004 extend parallel to each other and are equally spaced apart from each other. The spacing between adjacent conductive traces is selected in accordance with a given application. The present solution is not limited to the linear line shapes and/or spacing shown in FIG. 21 for the conductive traces. For example, in other scenarios, the conductive traces comprise a plurality of concentric rings, a plurality of serpentine lines, a plurality of traces forming a grid pattern, or a plurality of traces forming an overlapping pattern.

Five (5) conductive traces are shown in FIG. 21. The present solution is not limited in this regard. The antenna modulation marker 1804 can include any number of conductive traces in accordance with the given application (e.g., 1-N conductive traces).

Figure 22:
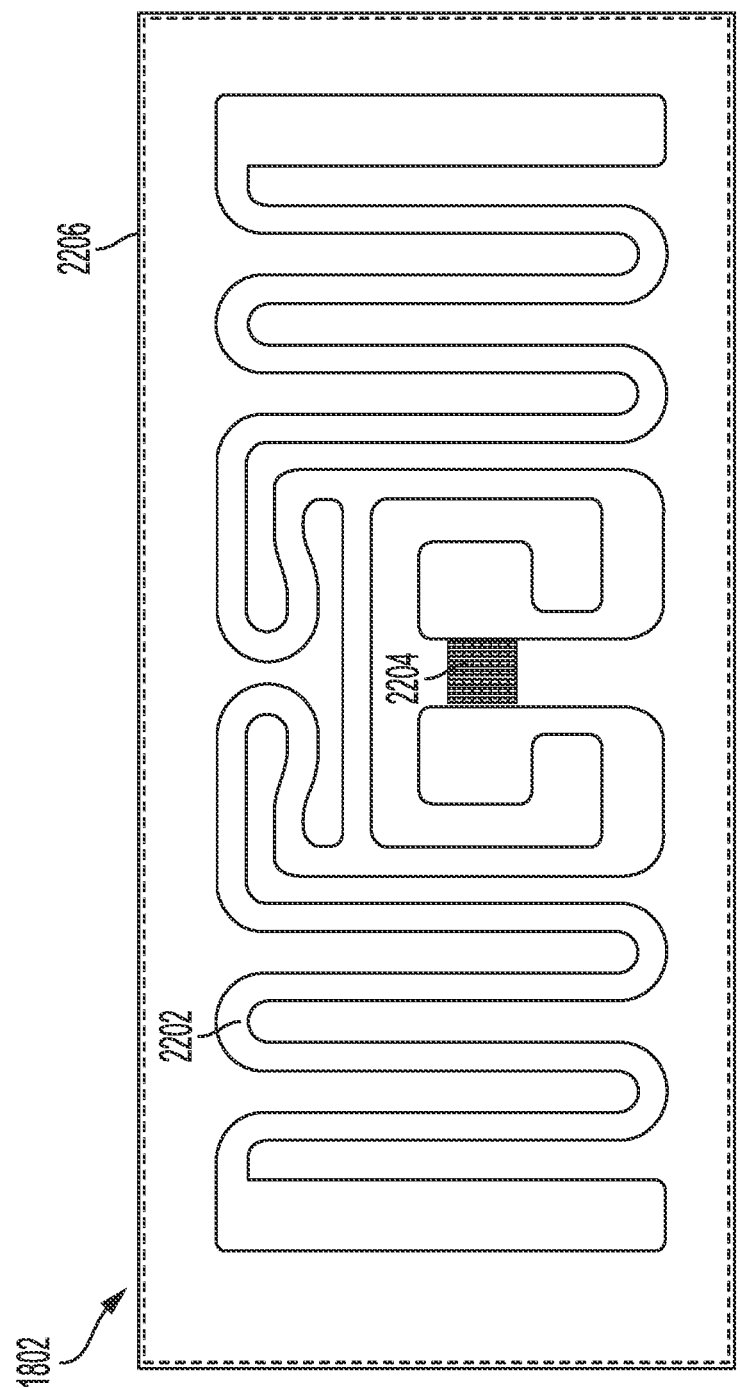
FIG. 22 provides an illustration of an illustrative architecture for the RFID tag shown in FIGS. 18-19.

Referring now to FIG. 22, there is an illustration of an illustrative architecture for the RFID tag 1802. The RFID tag 1802 can be the same as or similar to the RFID tag 102 described in relation to FIG. 17. Alternatively, the RFID tag 1802 can have at least one characteristic or component different than that of the RFID tag 102. In this case, the RFID tag 1802 can include the passive tag shown in FIG. 22. RFID tag 1802 is configured for allowing data to be exchanged with an external device (e.g., tag reader 106 of FIG. 1) via wireless communication technology. The wireless communication technology can include, but is not limited to, RFID technology.

In general, the passive RFID tag 1802 is comprised of three parts: antenna 2202 for receiving and transmitting information; an optional RFID IC chip 2204 for storing and processing information; and a substrate 2206. The IC chip 2204 controls communication to/from the RFID tag 1802, and facilitates energy harvesting for the passive RFID tag 1802. In this regard, it should be noted that the RFID tag 1802 does not have an internal power supply. This RFID system relies on the exchange of power and information between the tag reader 1806 and the RFID tag 1802. The tag reader provides power and communicates with the tag over an RF link. The tag communicates back to the tag reader with data by backscattering a signal from the tag reader.

As shown in FIG. 5, the IC chip 2204 is coupled to at least one antenna 2202 for allowing data to be exchanged with the external device via a wireless communication technology (e.g., an RFID technology). The antenna 2202 is configured to receive signals from the external device and/or transmit signals generated by the IC chip 2204. The antenna 2202 is designed to: facilitate communications at a frequency spectrum that does not allow a tag reader to detect signals when the antenna is in proximity (e.g., within 0-10 mm) of a passive antenna modulation marker; and facilitate communications at a frequency spectrum that allows a tag reader to detect signals when the antenna is not in proximity (e.g., not within 0-10 mm) of the passive antenna modulation marker. Therefore, the behavior of the tag 1802 may be modulated when in proximity with a passive antenna modulation marker. The passive antenna modulation marker may modulate the behavior of the RFID tag 1802, for example, by changing the tag's resonant frequency, attenuating an RFID signal's amplitude, shifting a phase of the RFID signal, and/or changing a polarization of a backscatter signal.

During operation, the IC chip 2204 processes received signals (e.g., RF signals) transmitted from external devices to determine whether it should transmit a response signal (e.g., RF carrier signal) to external devices or provide a backscatter response to the external device. In this way, the IC chip 2204 can optionally facilitate the locating and/or tracking of an item as described below in relation to FIGS. 27-31.

Figure 25:
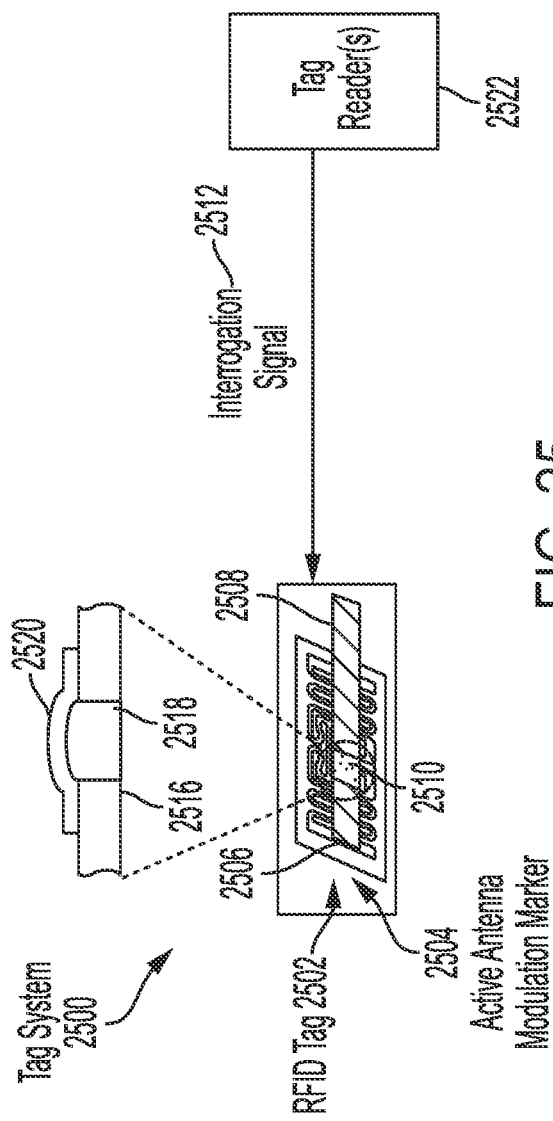
FIGS. 25-26 provide illustrations of another illustrative tag system for detecting the presence and location of an item or object.
Figure 26:
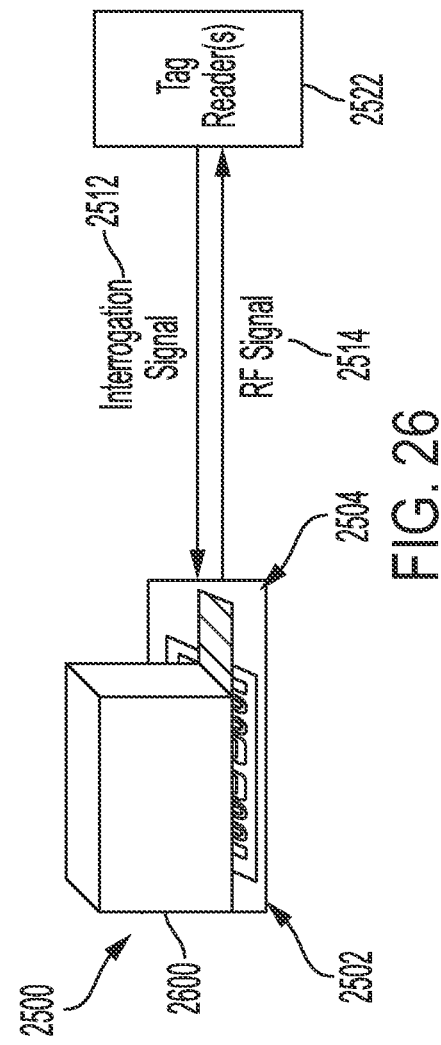

Referring now to FIGS. 25-26, there are provided illustrations of another illustrative RFID tag system 2500. RFID tag system 2500 is generally configured to determine or measure the exact location of objects with RFID tags (e.g., in real time or near real time). The RFID tag system 2500 comprises at least one RFID tag 2502 and at least one active antenna modulation marker 2504. The active antenna modulation marker 2504 generally comprises an active structure that can affect communication characteristics of a tag antenna whereby the output signal from the tag can be selectively modified. The RFID tag 2502 and the active antenna modulation marker 2504 may be applied to an item/object such that a distance therebetween is maintained throughout operation of RFID tag system 2500. For example, the item/object comprises a part of infrastructure (e.g., a shelf of display equipment, a box, a wall, etc.).

The active antenna modulation marker 2504 is located between two conductive traces 2506 and 2508, and is configured to selectively close a gap (not visible in FIGS. 25-26) to form a closed circuit between the traces 2506, 2508. As such, the active antenna modulation marker 2504 acts as a switch that is normally in an open position, and transitions from the open position to the closed position in response to a change in an amount of light exposure to the sensor of marker 2504. In this regard, the active antenna modulation marker 2504 comprises a photo-conductor 2518 disposed in the gap between the conductive traces 2506, 2508. The change in light exposure can occur when an object 2600 is placed on top of the active antenna modulation marker 2504. When the object 2600 blocks ambient light, the switch is open such that wireless communications from the RFID tag 2502 are enabled (otherwise, it is disabled). An optional color filter 2520 may be placed above the photo-conductor 2518. The color filter 2520 enables color sensing and reading to identify different items.

During operation, the RFID tag 2502 communicates at a frequency spectrum that does not allow a tag reader 2522 to detect the signal when the adjacent active antenna modulation marker 104 is receiving a given amount of ambient light. This is shown in FIG. 25 where the RFID tag 2502 either (1) rejects the interrogation signal 2512 since it is outside of the tag's receive operational frequency range or (2) transmits an RF signal (not shown) in response to the interrogation signal 2512 but the signal is not detected by the tag reader 2522, when the active antenna modulation marker 2504 that is in an induced operational state caused by exposure to the ambient light.

However, the RFID tag 2502 communicates at a frequency spectrum that allows the tag reader 2522 to detect the signal when the active antenna modulation marker 2504 is not exposed to a given amount of ambient light. This is shown in FIG. 26 where the RFID tag 2502 transmits an RF signal 2514 that is received by the tag reader 2522 since the object 2600 blocks ambient light from being received by the active antenna modulation marker 2504.

Therefore, the behavior of the RFID tag 2502 may be modulated when the active antenna modulation marker 104 that is not being exposed to a given amount of ambient light. More specifically, the active antenna modulation marker actually causes the RFID tag to change its absorption and transmission signal spectrum when ambient light is being at least partially blocked from reaching the active antenna modulation marker. When ambient light is being at least partially blocked from reaching the active antenna modulation marker, the active antenna modulation marker effectively becomes part of the RFID tag's antenna so that the RFID tag's antenna emits a signal at a different frequency spectrum that allow the tag reader 2522 to detect the signal. When the active antenna modulation marker is fully exposed to the ambient light, the photoconductor provides conductance (low impedance between the conductive traces 2506 and 2508 and enables the modulation marker to block RF transmission. Notably, the frequency spectrum is a function of signal frequency versus signal amplitude. The active antenna modulation marker 2504 may modulate the communications behavior of the RFID tag 2502, for example, by changing the tag's resonant frequency, enhancing an RFID signal's amplitude, shifting a phase of the RFID signal, and/or changing a polarization of a backscatter signal.

Illustrative Inventorying System

The above described tag systems 100, 1800, 2500 can be used in a variety of applications. For example, the tag systems 100, 1800, 2500 can be used in retail store applications. Accordingly, an illustrative retail store application of the present solution will now be described in relation to FIGS. 27-29.

Figure 27:
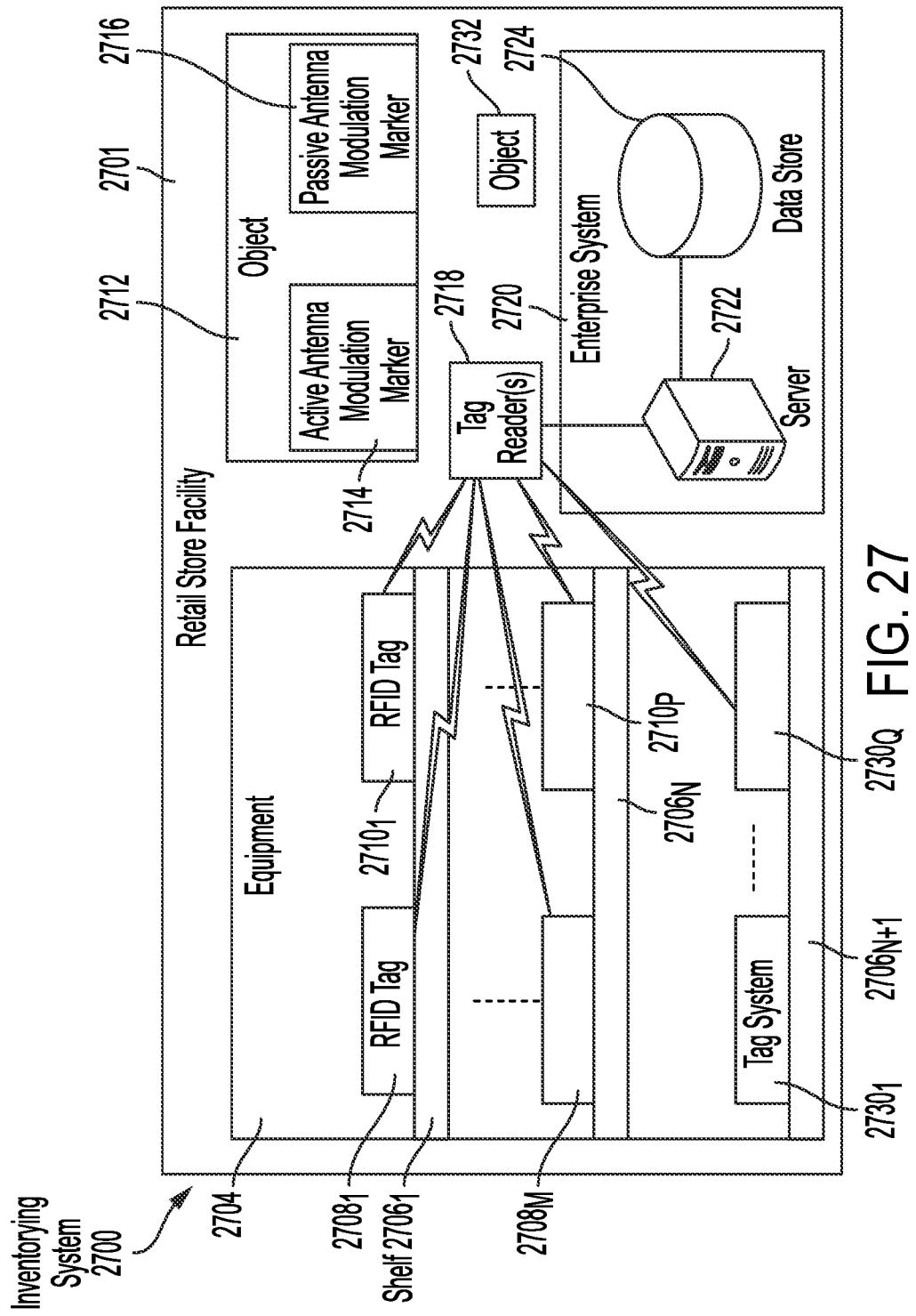
FIGS. 27-31 provides illustrations of illustrative inventorying systems in which the present solution can be employed.

Referring now to FIG. 27, there is provided a schematic illustration of an illustrative inventorying system 2700 that is useful for understanding the present solution. The present solution is described herein in relation to a retail store environment. The present solution is not limited in this regard, and can be used in other environments. For example, the present solution can be used in distribution centers, factories and other commercial environments. Notably, the present solution can be employed in any environment in which locations and/or states of objects/items need to be determined and/or tracked.

The inventorying system 2700 is generally configured to allow improved inventory counts of objects and/or items located within a facility, and/or improved detection of object and/or items that need to be taken off the floor due to changes in states/conditions. As shown in FIG. 27, inventorying system 2700 comprises a Retail Store Facility (RSF) 2701 in which equipment 2704 is disposed. The equipment is provided for displaying objects (or items) 2712, 2732 to customers of the retail store and/or for holding the objects (or items) during a purchase transaction and/or a return transaction. The equipment can include, but is not limited to, shelves $2706_1, \ldots, 2706_N, 2706_{N+1}$ (collectively referred to as "2706"), article display cabinets, promotional displays, fixtures, checkout counters, and/or equipment securing areas of the RSF 2701. The RSF can also include emergency equipment (not shown) and an Electronic Article Surveillance (EAS) system (not shown). Emergency equipment and EAS systems are well known in the art, and therefore will not be described herein.

One or more tag readers 2718 are provided to assist in counting and/or managing objects 2712, 2732 located within the RSF 2701. Each tag reader 2718 comprises an RFID reader configured to read RFID tags $2708_1, \ldots, 2708_M$ (collectively referred to as "2708"), $2710_1, \ldots, 2710_P$ (collectively referred to as "2210") and/or RFID tags of tag systems $2730_1, \ldots, 2730_Q$ (collectively referred to as "2730"). Tag reader 2718 is strategically placed at a known location within the RSF 2701. For example, the tag reader 2718 is placed in proximity to the equipment 2704 (e.g., at the end of an aisle or at a checkout counter). The present solution is not limited in this regard. The tag reader 2718 can alternatively be a mobile tag reader that is moved into a Zone Of Interest (ZOI) inside the RSF 2701. The ZOI can include any area in the RSF such as a particular aisle and/or a particular section (e.g., the frozen section, the adult women's dress section, changing rooms, stockroom, garden section, entryway, etc.).

By correlating the tag reader's RFID tag reads and the tag reader's known location within the RSF 2701, it is possible to determine the location of objects 2712, 2732 within the RSF 2701. The tag reader's known coverage area also facilitates object location and state determinations. Accordingly, RFID tag read information and tag reader location information is stored in a data store 2724. This information can be stored in the data store 2724 using a server 2722. Server 2722 will be described in more detail below in relation to FIG. 32. The sever 2722 and the data store 2724 are collectively referred to herein as an enterprise system 2720.

During operation, inventorying system 2700 may be used as an object identification, location and management system. In this regard, RFID tags 2208, 2710 and/or tag systems 2730 are respectively attached or coupled to the shelves 2706. RFID tags 2208 can be the same as or substantially similar to RFID tag 102 of the above described tag system 100. RFID tags 2710 can be the same as or substantially similar to RFID tag 1802 of the above described tag system 1800. Tag systems 2730 can be the same as or substantially similar to the above described tag system 2500. RFID tags 2708, 2710 and tag systems 2730 are coupled to the equipment 2704 so as to create smart equipment (e.g., a smart shelve(s) 2706). The RFID tags and tag systems are described herein as comprising single-technology tags that are only RFID enabled. The present solution is not limited in this regard. One or more of the RFID tags can alternatively or additionally comprise dual-technology tags that have both EAS and RFID capabilities.

RFID tags 2708, 2710 and tag systems 2730 have unique identifiers assigned thereto such that they can be distinguished from each other. Additionally, each component 2708, 2710, 2730 comprises an antenna for RF communications. The antenna is designed to emit RF signals at a frequency spectrum that allows the tag reader 2719 to detect the signal within its operating frequency range (e.g., 860-960 MHz). However, when the antenna of an RFID tag 2710 is in physical contact with a passive antenna modulation marker 2216 or within a small threshold distance away from a passive antenna modulation marker 2216, at least one of the antenna's operating characteristics is affected. Accordingly at the time that the RFID tag 2710 is proximate to the passive antenna modulation marker 2716, the RFID tag is capable of transmitting RFID signals at a different frequency spectrum that does not allow the tag reader 2718 to detect the signals within its operating frequency range (e.g., 2.4 GHz). Similarly, when the antenna of an RFID tag 2708 is in physical contact with or in proximity to an active antenna modulation marker 2214 that is exposed to a stimulus 2900 (e.g., heat), at least one of the antenna's operating characteristics is affected. Thus at the time the RFID tag 2708 is proximate to the active antenna modulation marker 2214 being exposed to the stimulus 2900, the RFID tag is capable of transmitting RFID signals at a different frequency spectrum that does not allow the tag reader 2718 to detect the signals within its operating frequency range, if the sensor of the modulation marker 2214 is constructed as a low impedance state when exposing to the stimulus. On the other hand, it can be the opposite, meaning the RF signal will be detected if the sensor is constructed as a high impedance state when exposing a stimulus. Basically, the sensor 408 is a switch to turn the RF detection between RF tag and the reader on and off wirelessly. Likewise, when an object 2732 is in contact with or proximity to a tag system 2730 such that ambient light is blocked therefrom, at least one characteristic of an antenna of the tag system 2730 is affected. At the time ambient light is being blocked, the photoconductor is at high impedance state, the tag system 2730 is capable of transmitting RFID signals at a different frequency spectrum that allows the tag reader 2718 to detect the signals within its operating frequency range.

The active and passive antenna modulation markers 2714, 2716 are shown in FIGS. 27-30 as being disposed on the bottom of an object 2712, and RFID tags 2708, 2710 are shown as being disposed on a structure (e.g., shelves 2706 of equipment 2704). In this way, the inventorying system 2700 is able to make a determination that the object 2712 is not in an area covered by the tag reader 2718 when the tag reader 2718 receives signals from the RFID tags 2708 and/or 2710 coupled to the shelves. The inventorying system 2700 is also able to make a determination that the object 2712 is in the area covered by the tag reader 2718 and on a given shelf (e.g., shelf $2706_1$) when the tag reader 2718 no longer receives signals from an RFID tag $2710_1, \ldots, 2710_P$ and/or an RFID tag $2708_1, \ldots, 2208_M$. The inventorying system 2200 is further able to make a determination about the state of the object 2712 when the tag reader 2718 no longer receives a signal from an RFID tag $2708_1, \ldots, 2208_M$.

Figure 31:
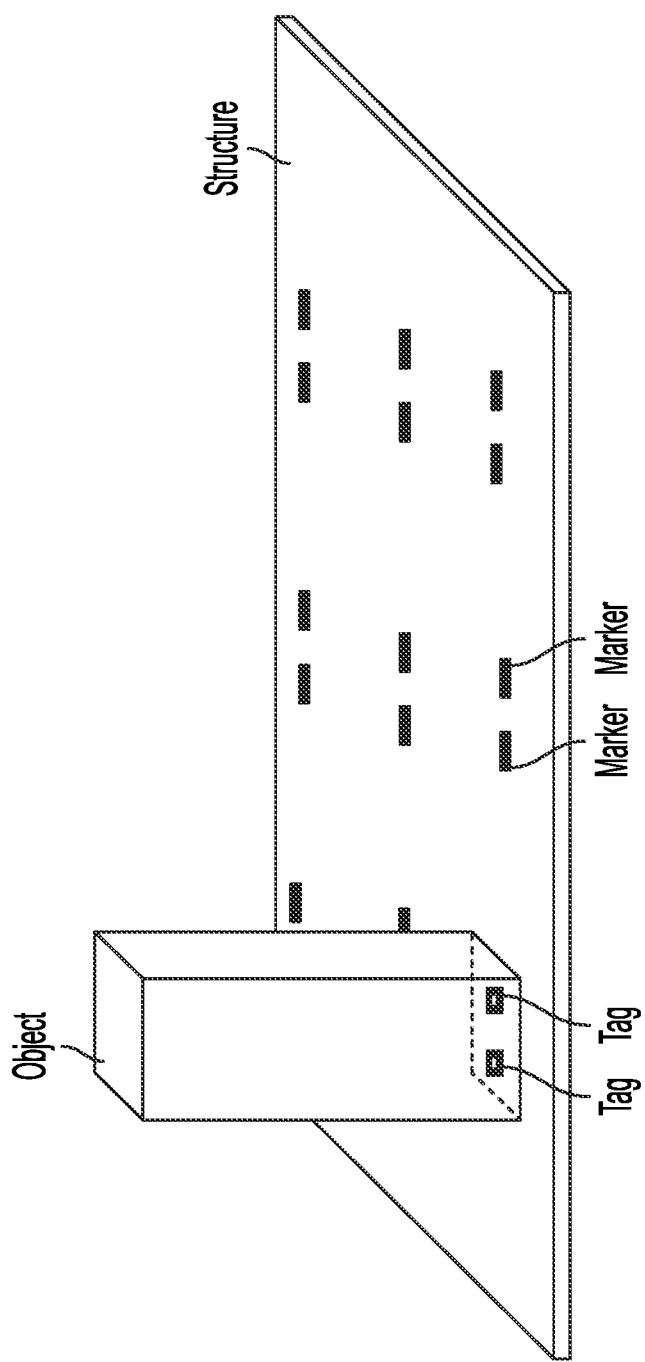

The present solution is not limited to this particular tag/marker arrangement. For example, as shown in FIG. 31, the RFID tags can alternatively be coupled to the object while the antenna modulation markers are coupled to the structure (e.g., shelves). In other scenarios, an RFID tag and an active antenna modulation marker are coupled to the object, while an RFID tag and a passive antenna modulation marker are coupled to the structure. In yet other scenarios, an RFID tag and a passive antenna modulation marker are coupled to the object, while an RFID tag and an active antenna modulation marker are coupled to the structure.

Figure 28:
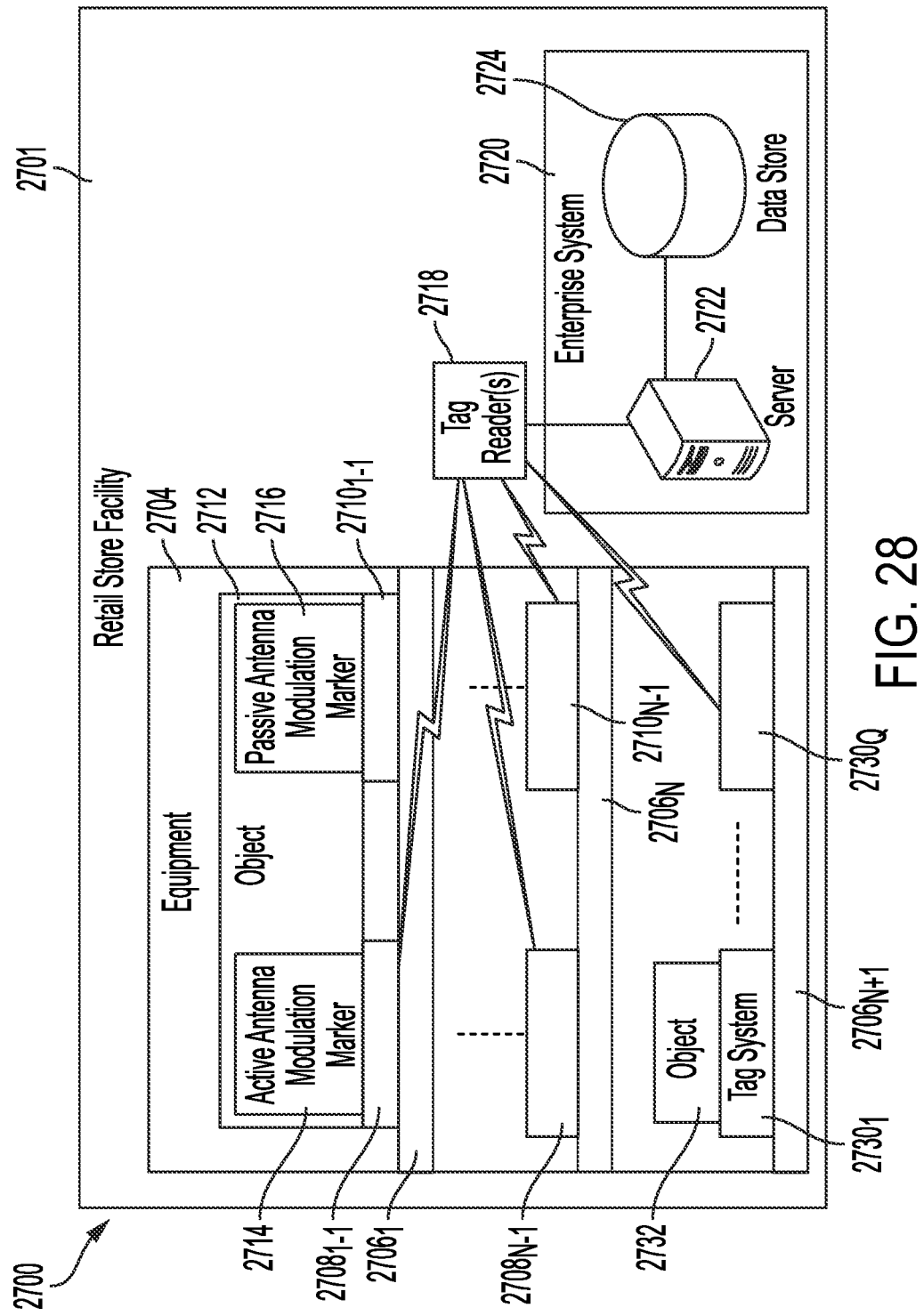
Figure 29:
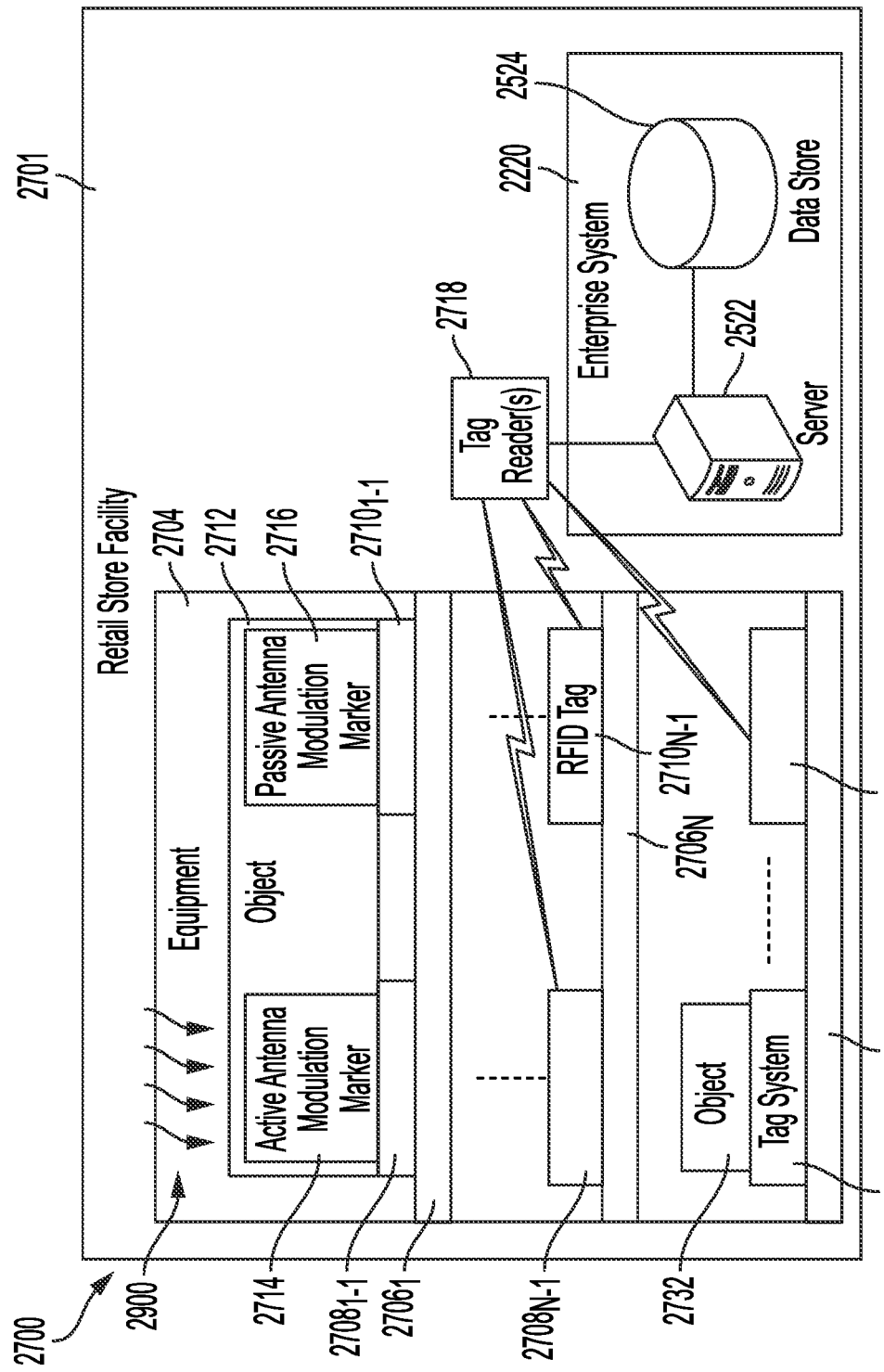

The tag systems $2730_1, \ldots, 2730_Q$ are shown in FIGS. 27-29 as being coupled to the structure, for example, shelf $2706_{N+1}$. In this way, the inventorying system 2700 is able to make a determination that the object 2732 is not in an area covered by the tag reader 2718 when the tag reader 2718 receives signals from the tag systems $2730_1, \ldots, 2730_Q$ coupled to the shelf $2706_{N+1}$. The inventorying system 2700 is also able to make a determination that the object 2732 is in the area covered by the tag reader 2718 and on a shelf $2706_{N+1}$ when the tag reader 2718 no longer receives signals from one of the tag systems $2730_1, \ldots, 2730_Q$.

Figure 30:
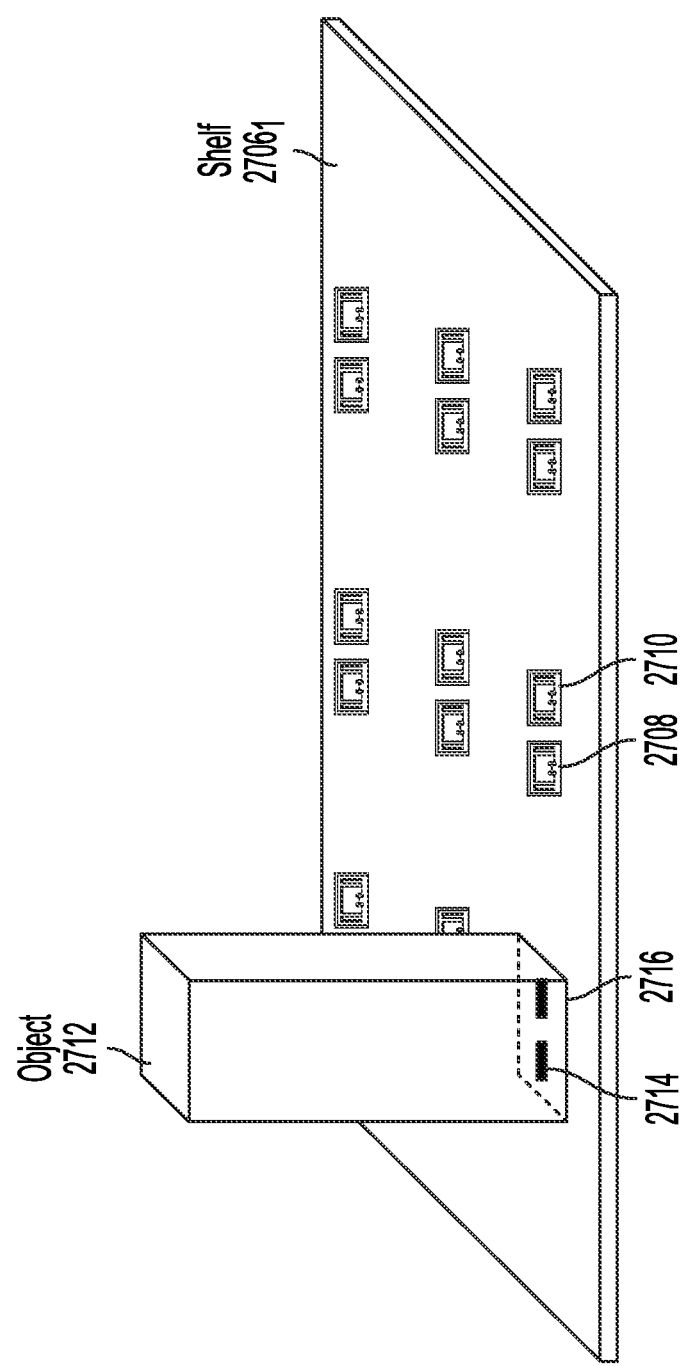

As shown in FIG. 30, an array of RFID tag pairs is provided on a shelf $2706_1$. Each pair includes one of the RFID tags 2708 and one of the RFID tags 2710. During operation, the tag reader 2718 reads the RFID tags of the array. When a signal is not received from at least one of the RFID tags (e.g., RFID tag $2710_1$ and/or $2708_1$), the inventorying system 2700 makes a determination that the object 2711 is in proximity of the particular RFID tag(s) on the shelf $2706_1$. This provides for more accurate object location within the RSF 2701 as compared to that provided in conventional systems. The inventorying system 2700 also makes a determination about the state of the object based on whether or not it is receiving a signal from a respective RFID tag of the RFID tags 2708. This provides for more accurate object management as compared to that provided in conventional systems.

The RF signals communicated from the RFID tags 2708, 2710 contain the unique identifiers thereof. The tag reader 2718 processes the RF signals to obtain the unique identifiers. The unique identifiers and timestamps are then communicated from the tag reader 2718 to the enterprise system 2720. At the enterprise system, the unique identifiers and timestamps are stored in a data store 2724 for object location, management and/or inventory purposes. The object locations reflect the area in which each object resides, the structure on which each object is disposed, and/or the part of the structure on which each object is disposed.

Notably, an array of tag systems 2730 can be provided in shelf $2706_{N+1}$. A unique identifier can be associated with each of the tag systems 2730. Accordingly, the inventory system could be configured to operate in a similar manner as that described in relation to FIG. 30 when tag systems 2730 are employed.

Figure 32:
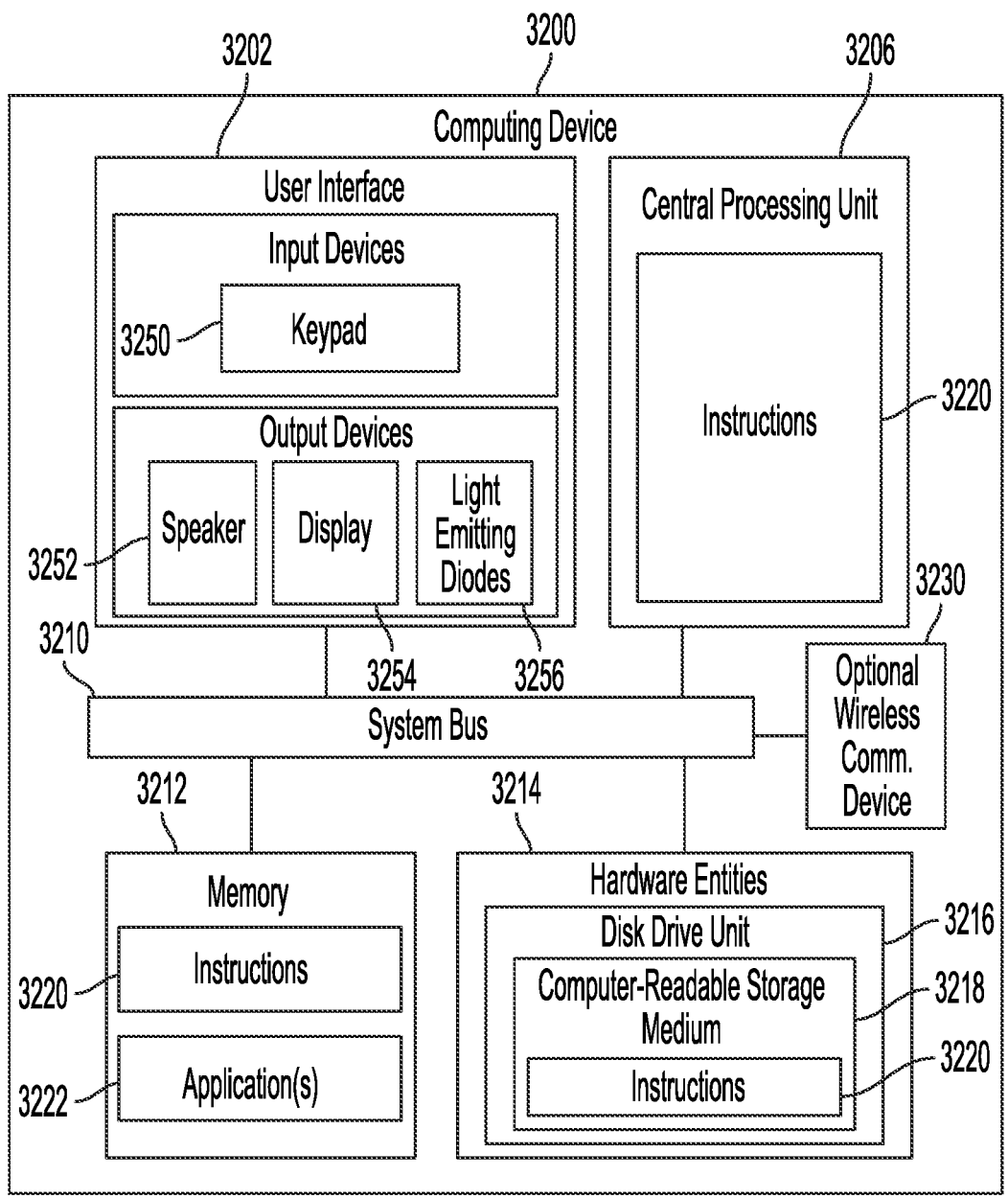
FIG. 32 provides a block diagram of an illustrative computing device.

Referring now to FIG. 32, there is provided a detailed block diagram of an example architecture for a computing device 3200. Tag reader 2718 and/or server 2722 of FIG. 27 may be the same as or substantially similar to computing device 3200. As such, the following discussion of computing device 3200 is sufficient for understanding tag reader 2718 and/or server 2722. Notably, the present solution can operate without use of a server.

Computing device 3200 may include more or less components than those shown in FIG. 32. However, the components shown are sufficient to disclose an illustrative embodiment implementing the present solution. The hardware architecture of FIG. 32 represents one embodiment of a representative computing device configured to facilitate inventory counts and management. As such, the computing device 3200 of FIG. 32 implements at least a portion of a method for determining object locations and/or states/conditions in accordance with the present solution.

Some or all the components of the computing device 3200 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 32, the computing device 3200 comprises a user interface 3202, a CPU 3206, a system bus 3210, a memory 3212 connected to and accessible by other portions of computing device 3200 through system bus 3210, and hardware entities 3214 connected to system bus 3210. The user interface can include input devices (e.g., a keypad 3250) and output devices (e.g., speaker 3252, a display 3254, and/or light emitting diodes 3256), which facilitate user-software interactions for controlling operations of the computing device 3200.

At least some of the hardware entities 3214 perform actions involving access to and use of memory 3212, which can be a RAM, a disk driver and/or a Compact Disc Read Only Memory (CD-ROM). Hardware entities 3214 can include a disk drive unit 3216 comprising a computer-readable storage medium 3218 on which is stored one or more sets of instructions 3220 (e.g., software code) configured to implement one or more of the methodologies, procedures, or functions described herein. The instructions 3220 can also reside, completely or at least partially, within the memory 3212 and/or within the CPU 3206 during execution thereof by the computing device 3200. The memory 3212 and the CPU 3206 also can constitute machine-readable media. The term "machine-readable media", as used here, refers to a single medium or multiple media (e.g., a centralized or distributed database, and/or associated caches and servers) that store the one or more sets of instructions 3220. The term "machine-readable media", as used here, also refers to any medium that is capable of storing, encoding or carrying a set of instructions 3220 for execution by the computing device 3200 and that cause the computing device 3200 to perform any one or more of the methodologies of the present disclosure.

In some scenarios, the hardware entities 3214 include an electronic circuit (e.g., a processor) programmed for facilitating the provision of a three-dimensional map showing locations of RFID tags within a facility and/or changes to said locations in near real-time. In this regard, it should be understood that the electronic circuit can access and run a software application 3222 installed on the computing device 3200. The software application 3222 is generally operative to facilitate: the determination of RFID tag locations within a facility; the direction of travel of RFID tags in motion; and/or the mapping of the RFID tag locations and/or movements in a virtual three dimensional space. Other functions of the software application 3222 are apparent from the content of this document. Such other functions can relate to tag reader control and/or tag control.

Illustrative Methods for Managing Objects

Figure 33A:
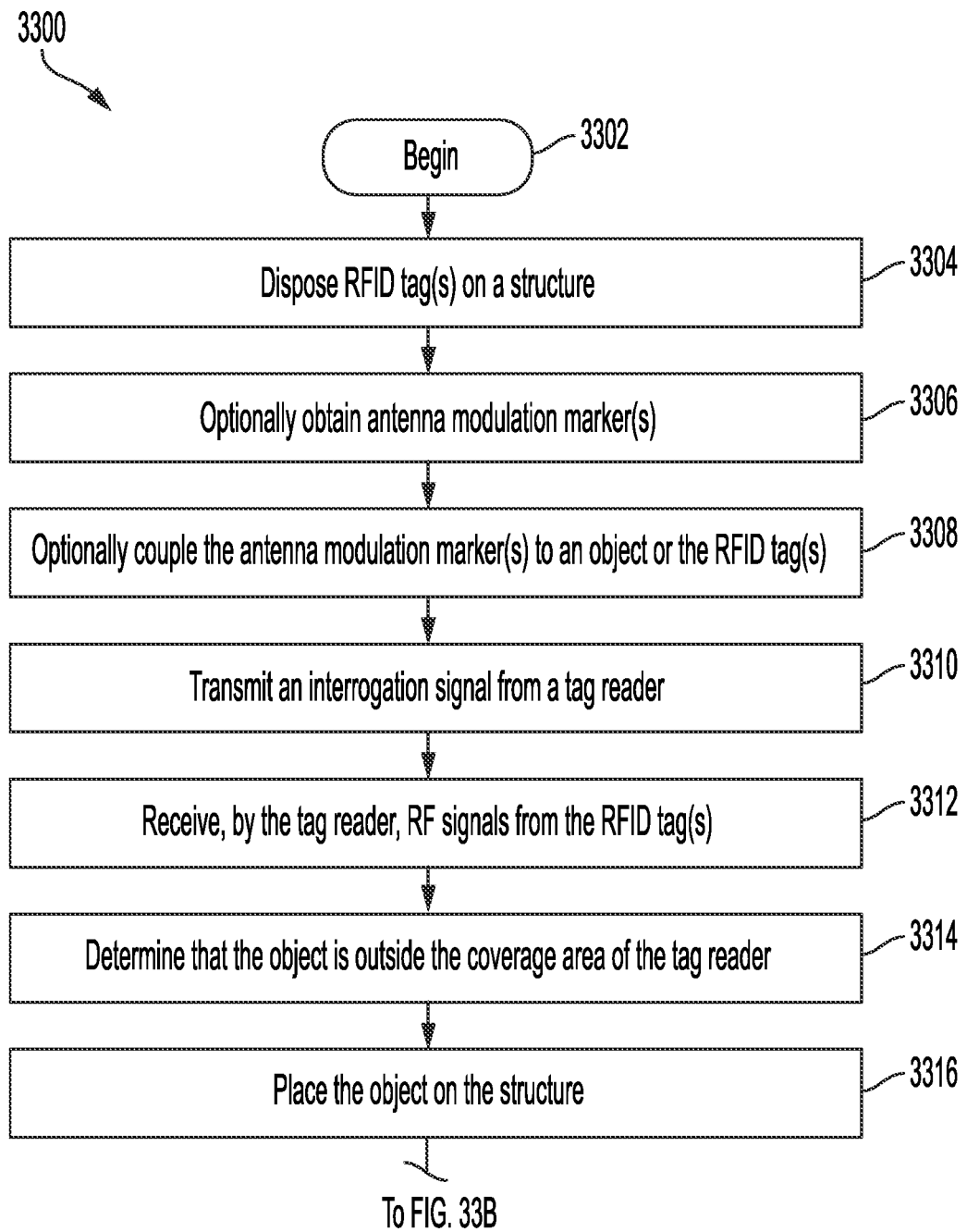
FIGS. 33A-33B (collectively referred to herein as "FIG. 3") provides a flow diagram of an illustrative method for operating a system in accordance with the present solution.
Figure 33B:
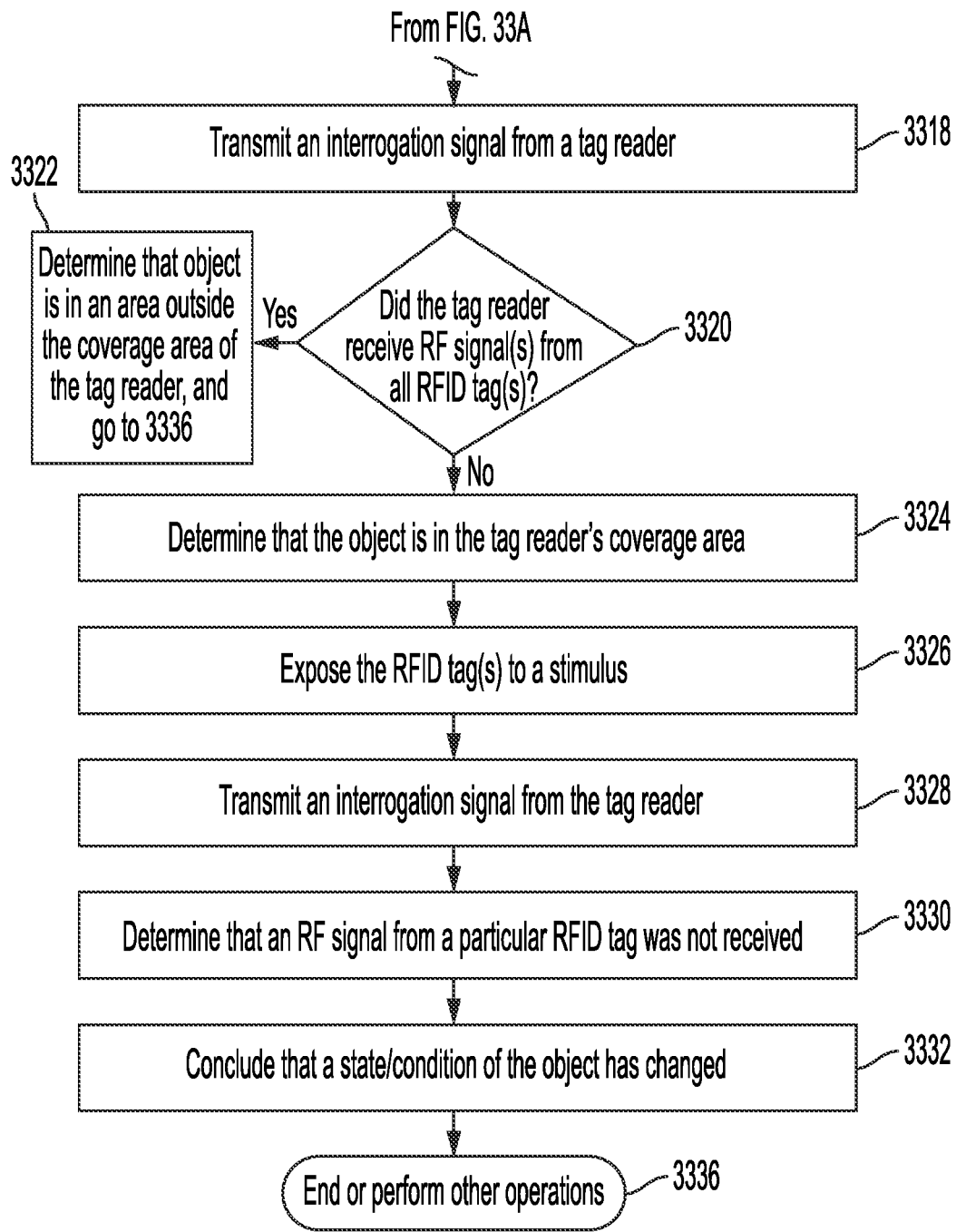

Referring now to FIG. 33, there is provided a flow diagram of an illustrative method 3300 for operating a system (e.g., system 100 of FIG. 1, 1800 of FIG. 18, 2500 of FIG. 25, and/or 2700 of FIG. 27). Method 3300 begins with 3302 and continues with 3304 where RFID tag(s) (e.g., RFID tag(s) 102 of FIG. 1, 1802 of FIG. 18, 2502 of FIG. 25) is(are) disposed on a structure (e.g., equipment 2704 of FIG. 27). In optional 3306, antenna modulation marker(s) (e.g., antenna modulation marker 104 of FIG. 1, 1804 of FIG. 18 and/or 2504 of FIG. 25) is(are) obtained. The antenna modulation marker(s) is(are) coupled to an object (e.g., object 2712 of FIG. 27) or the RFID tag(s), as shown by optional 3308. When coupled to the object, a tag system is formed that is the same as or substantially similar to that shown in FIG. 1 and/or FIG. 18. When coupled to the RFID tag(s), one or more tag systems is formed that are the same as or substantially similar to that shown in FIG. 25.

In 3310, an interrogation signal is transmitted from a tag reader (e.g., tag reader 106 of FIG. 1, 1806 of FIG. 18, 2522 of FIG. 25, and/or 2718 of FIG. 27). Interrogation signals are well known in the art. Next in 3312, the tag reader receives RF signals from the RFID tag(s). As such, the system determines that the object is outside the coverage area of the tag reader.

In 3316, the object is placed on the structure. The tag reader transmits another interrogation signal in 3318. If the tag reader received RF signal(s) from all of the RFID tag(s) [3320: YES], then the system determines that the object is in an area that is outside of the coverage area of the tag reader. Method 3300 then continues to 3336 which will be discussed below. In contrast, if the tag reader did not receive an RF signal from at least one RFID tag [3320: NO], then the system determines in 3324 that the object is in the coverage area of the tag reader.

Next in 3326, the RFID tag(s) is(are) exposed to a stimulus (e.g., stimulus 304 of FIG. 3 and/or 2900 of FIG. 29). The tag reader transmits another interrogation signal in 3328. The system determines in 3330 that an RF signal from a particular RFID tag (e.g., RFID tag 102 of FIG. 1, $2708_1$ of FIG. 28, . . . , or $2708_M$ of FIG. 28) was not received. Accordingly, the system concludes in 3332 that a state/condition of the object has changed. Information specifying this conclusion can be stored in a datastore (e.g., datastore 2724 of FIG. 27). Also, one or more measures/actions can be take in response to the change in the object's state/condition. For example, the object can be removed from the structure and discarded/replaced. Subsequently, 3336 is performed where method 3300 ends or other operations are performed by the system (e.g., return to 3302).

Figure 34:
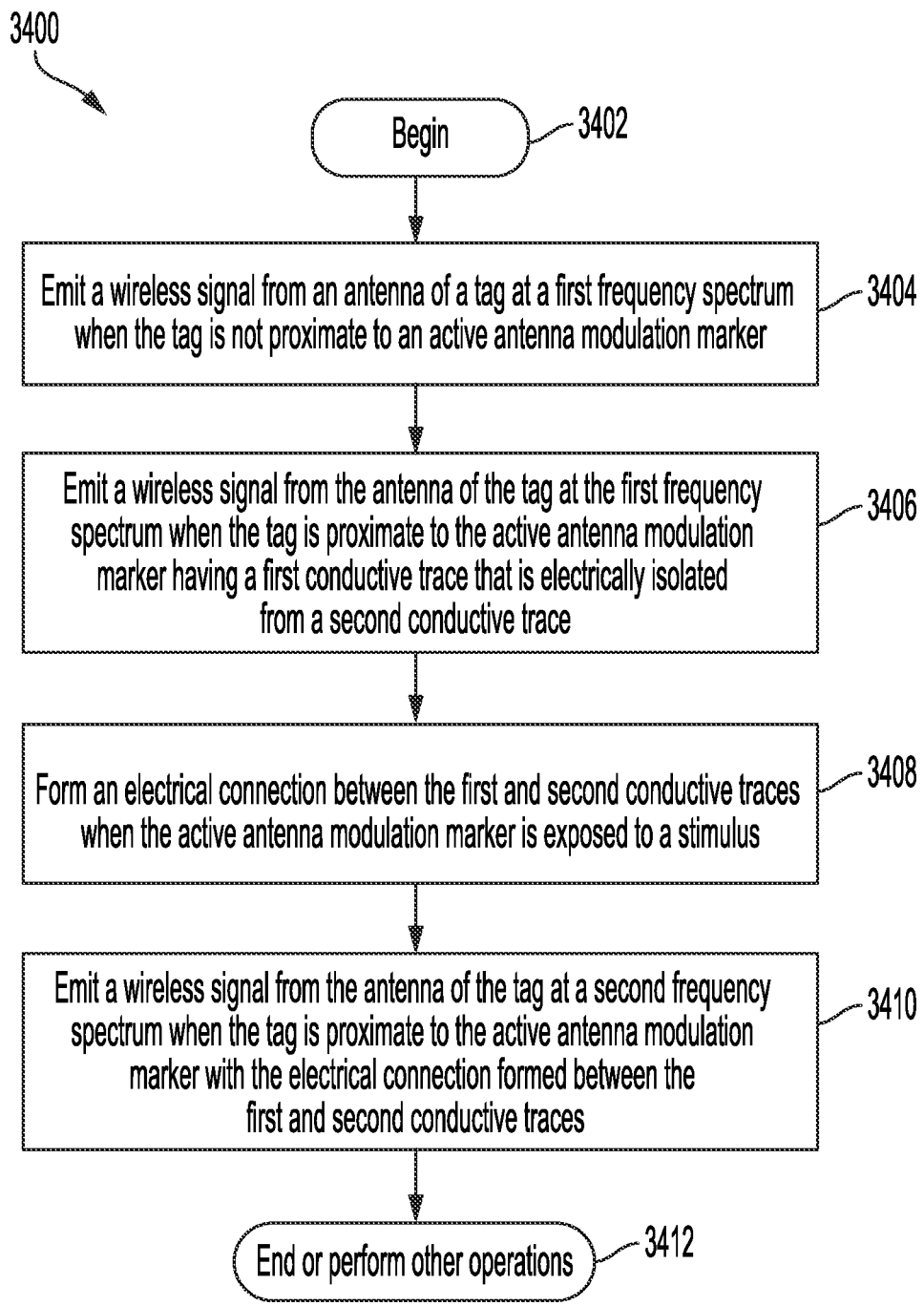
FIG. 34 provides a flow diagram of another illustrative method for operating a tag system in accordance with the present solution.

Referring now to FIG. 34, there is provided a flow diagram of an illustrative method 3400 for operating a tag system. The method begins with 3402 and continues with 3404 where a wireless signal is emitted from an antenna of the tag at a first frequency spectrum when the tag is not proximate to an active antenna modulation marker. In 3406, a wireless signal is emitted from the antenna of the tag at the first frequency spectrum when the tag is proximate to the active antenna modulation marker having a first conductive trace disposed on a substrate that is electrically isolated (or having a high impedance) from a second conductive trace disposed on the substrate. A change of impedance is formed in 3408 between the first and second conductive traces when the active antenna modulation marker is exposed to a stimulus. In 3410, a wireless signal is emitted from the antenna of the tag at a second frequency spectrum when the tag is proximate to the active antenna modulation marker with a low impedance formed between the first and second conductive traces. The second frequency spectrum is different from the first frequency spectrum. Subsequently 3412 is performed where method 3400 ends or other operations are performed (e.g., return to 3402).

The stimulus can include, but is not limited to, a change in temperature, a change in moisture, a change in a pH level, a change in pressure, a change in ambient light, a chemical, and/or vibration. The active antenna modulation marker comprises a sensor disposed on the substrate between the first and second conductive traces. The sensor is responsive to the stimulus for changing the impedance between the first and second conductive traces. The sensor can include, but is not limited to, an electrochemical cell, a piezoelectric sensor, a thermistor, a MEMS switch, and/or a photo-conductor. In this regard, the sensor may have a voltage that changes in response to the stimulus. Alternatively or additionally, the sensor comprises two electrodes and a sensing material disposed adjacent at least one of the two electrodes. A volume of the sensing material expandable in response to the stimulus so as to cause the two electrodes to come in contact with each other and establish a low impedance connection. Alternatively or additionally, the sensor comprises an elongate conductive member connected to the first conductive trace and cantilevered over the second conductive trace by a sensing material. The sensing material changing from a solid to a liquid in response to the stimulus so as to cause the elongate conductive member to come in contact with the second conductive trace.

Figure 35:
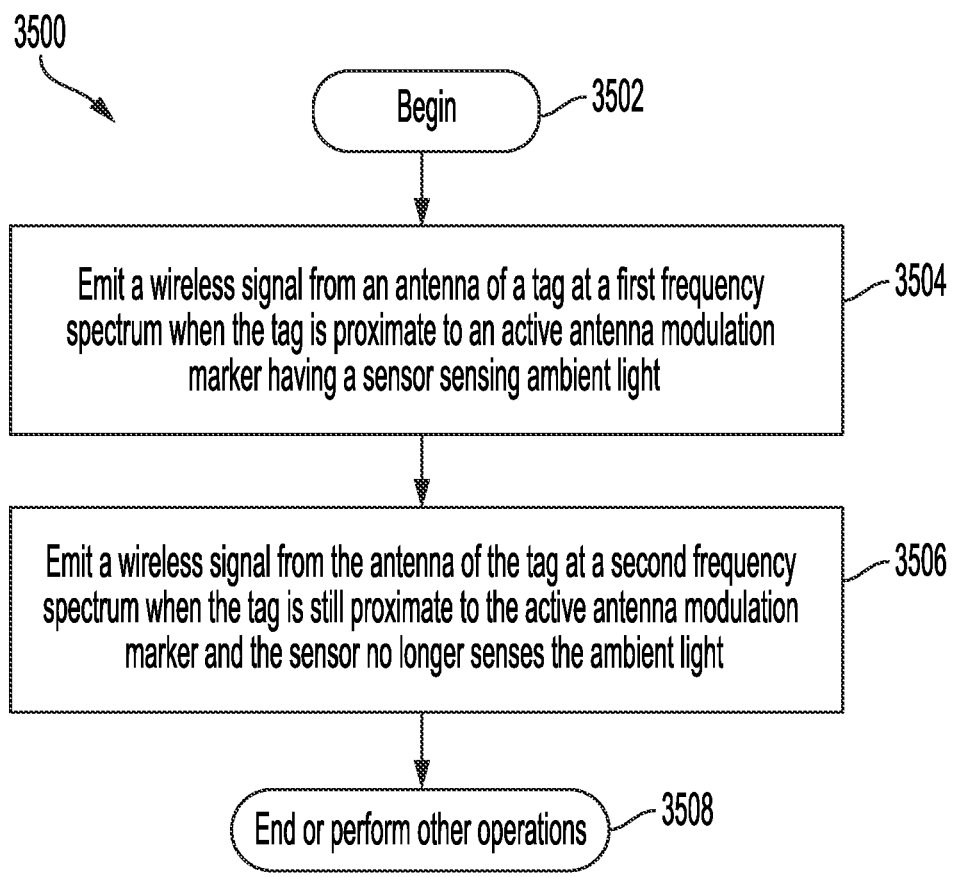
FIG. 35 provides a flow diagram of another illustrative method for operating a tag system in accordance with the present solution.

Referring now to FIG. 35, there is provided a flow diagram of another illustrative method 3500 for operating a tag system. If the sensor 408 is a photoconductor, exposure to an ambient light establishes a low impedance connection. A high impedance connection can be established by blocking ambient light to the sensor. The method begins with 3502 and continues with 3504 where a wireless signal is emitted from an antenna of a tag at a given frequency spectrum when the tag is proximate to an active antenna modulation marker having a sensor sensing ambient light. In 3506, a wireless signal is emitted from the antenna of the tag at another frequency spectrum when the tag is still proximate to the active antenna modulation marker and the sensor no longer senses the ambient light. The second frequency spectrum is different from the first frequency spectrum. Subsequently 3508 is performed where method 3500 ends or other operations are performed (e.g., return to 3502).

Figure 36:
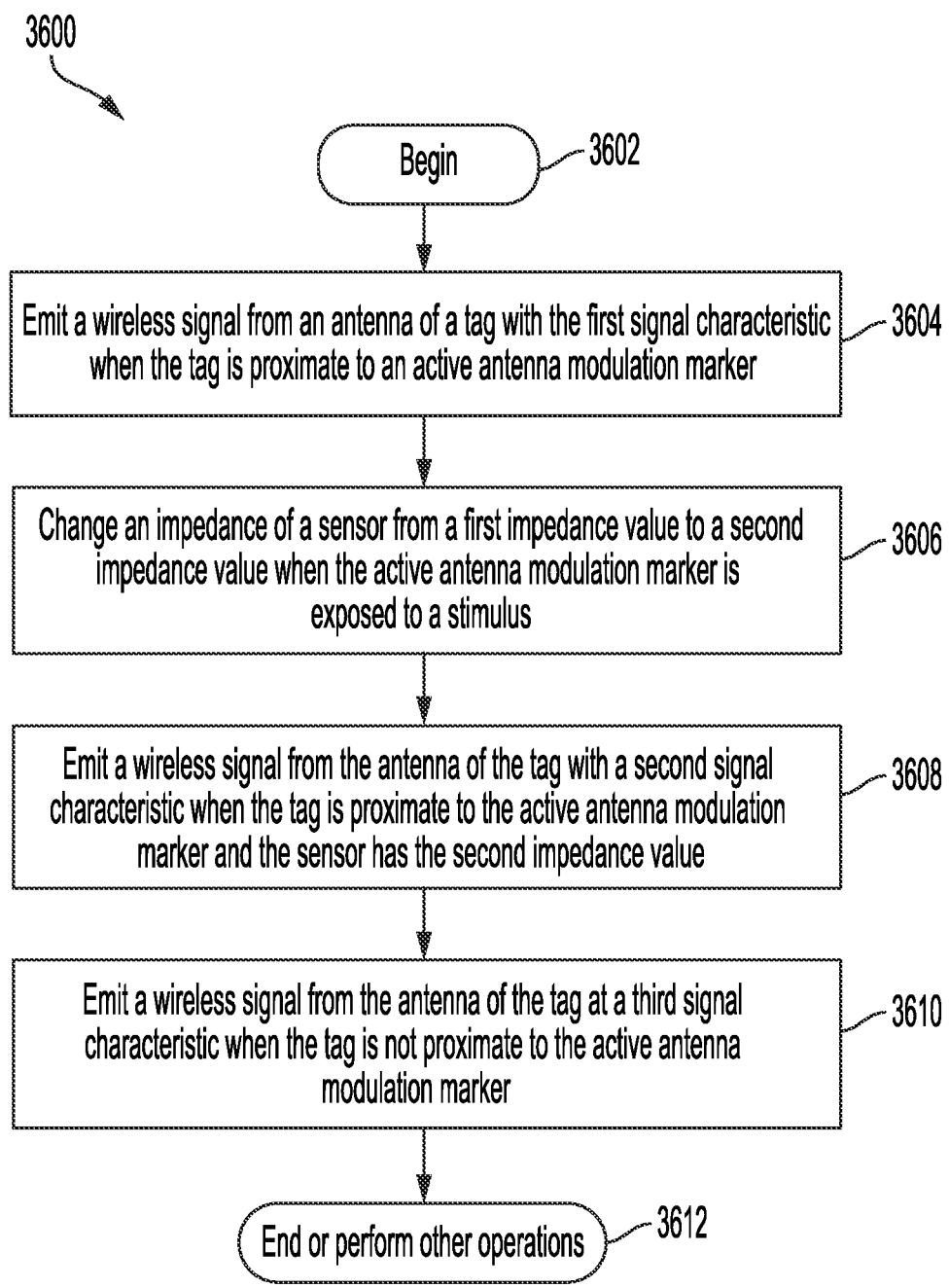
FIG. 36 provides a flow diagram of another illustrative method for operating a tag in accordance with the present solution.

Referring now to FIG. 36, there is provided a flow diagram of another illustrative method 3600 for operating a tag system. Method 3600 begins with 3602 and continues with 3604 where a wireless signal is emitted from an antenna of the tag with a first signal characteristic when the tag is proximate to an active antenna modulation marker. The active antenna modulation marker has first and second conductive traces disposed on a substrate and connected to sensor. In 3606, an impedance of the sensor is changed from a first impedance value to a second impedance value when the active antenna modulation marker is exposed to a stimulus. In 3808, a wireless signal is emitted from the antenna of the tag with a second signal characteristic when the tag is proximate to the active antenna modulation marker with the sensor having the second impedance value. The second signal characteristic is different from the first signal characteristic. In 3810, a wireless signal is emitted from the antenna of the tag at a third signal characteristic when the tag is not proximate to the active antenna modulation marker. The third signal characteristic is different from the first signal characteristic and/or the second signal characteristic. The first signal characteristic, second signal characteristic and third signal characteristic may include, but is not limited to, a frequency spectrum, a resonant frequency, a backscattered amplitude, a signal phase and/or a signal polarization. The stimulus may include, but is not limited to, a change in temperature, a change in moisture, a change in a pH level, a change in pressure, a change in ambient light, a chemical, and/or vibration. Subsequently, 3612 is performed where method 3600 ends or other operations are performed (e.g., return to 3602).

Figure 37:
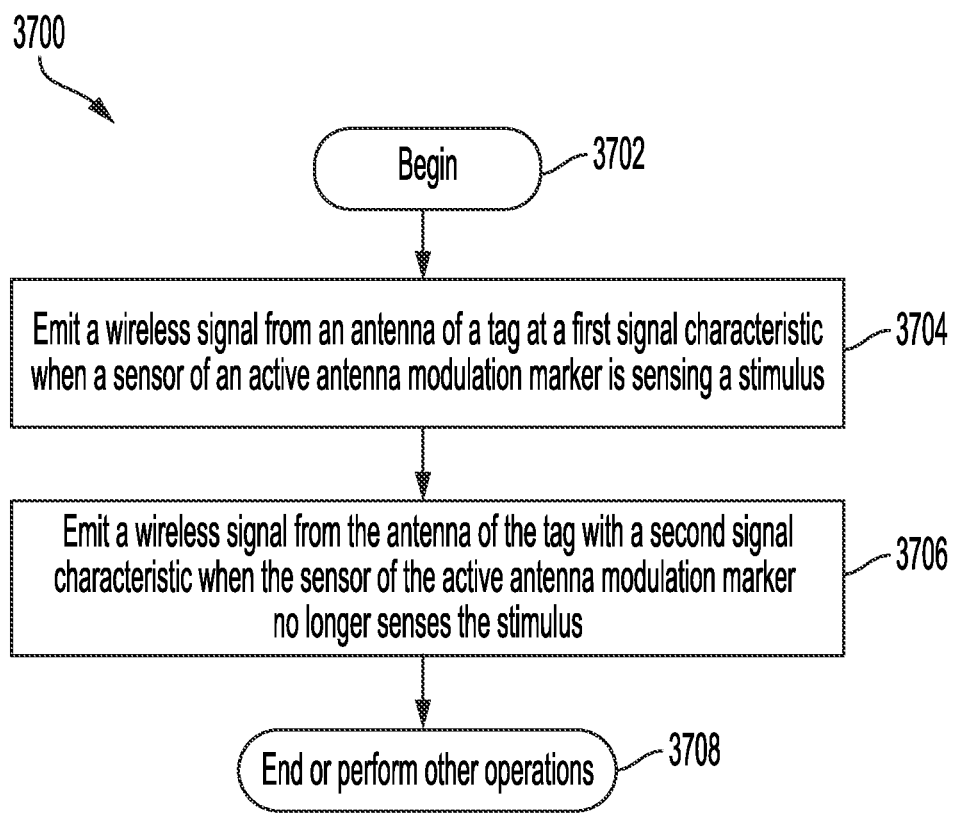
FIG. 37 provides a flow diagram of another illustrative method for operating a tag in accordance with the present solution.

Referring now to FIG. 37, there is provided another illustrative method for operating a tag system. Method 3700 begins with 3702 and continues with 3704 where a wireless signal is emitted from an antenna of a tag at a first signal characteristic when a sensor of an active antenna modulation marker is sensing a stimulus. In 3706, a wireless signal is emitted from the antenna of the tag with a second signal characteristic when the sensor of the active antenna modulation marker no longer senses the stimulus. The second signal characteristic is different from the first signal characteristic. The first signal characteristic and/or second signal characteristic can include, but is not limited to, a frequency spectrum, a resonant frequency, a back-scattered amplitude, a signal phase or a signal polarization. Subsequently, 3708 is performed where method 3700 ends or other operations are performed (e.g., return to 3702).

The present solution is not limited to the particulars described above. In some scenarios the signal characteristic of the tag changes, but that change is detected by the wireless chip rather than the tag reader. For example, RFID chips may include an internal bank of capacitors for controlling impedance matching with the antenna. Upon receiving a signal, these chips switch capacitors on and off to maximize the received signal power, then communicate the state of the switched capacitors back to the tag reader as a digital code. Thus, it's possible to change the tag resonant frequency, but have that change measured by the tag itself and transmitted back as a digital signal.

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

What is claimed is:

1. A method for operating a tag system, comprising:
    emitting a wireless signal from an antenna of a tag with a first signal characteristic when the tag is proximate to an active antenna modulation marker having first and second conductive traces disposed on a substrate and connected to sensor having a first impedance value;
    changing an impedance of the sensor from the first impedance value to a second impedance value when the active antenna modulation marker is exposed to a stimulus; and
    emitting a wireless signal from the antenna of the tag with a second signal characteristic when the tag is proximate to the active antenna modulation marker and the sensor has the second impedance value, where the second signal characteristic is different from the first signal characteristic.

2. The method according to claim 1, wherein at least one of the first signal characteristic and the second signal characteristic comprises a frequency spectrum, a back-scattered amplitude, a signal phase or a signal polarization.

3. The method according to claim 1, wherein the stimulus comprises at least one of a change in temperature, a change in moisture, a change in a pH level, a change in pressure, a change in ambient light, a chemical, and vibration.

4. The method according to claim 1, wherein the sensor is disposed on the substrate between the first and second conductive traces.

5. The method according to claim 4, wherein the sensor is responsive to the stimulus by closing a gap between the first and second conductive traces to form a low impedance electrical connection.

6. The method according to claim 1, wherein the sensor comprises at least one of an electrochemical cell, a piezoelectric sensor, a thermistor, a MEMS switch, and a photoconductor.

7. The method according to claim 1, wherein the sensor has a voltage that changes in response to the stimulus.

8. The method according to claim 1, wherein sensor comprises two electrodes and a sensing material disposed adjacent at least one of the two electrodes, a volume of the sensing material expandable in response to the stimulus so as to cause the two electrodes to come in contact with each other.

9. The method according to claim 1, wherein the sensor comprises an elongated conductive member connected to the first conductive trace and cantilevered over the second conductive trace by a sensing material, the sensing material changing from a solid to a liquid in response to the stimulus so as to cause the elongated conductive member to come in contact with the second conductive trace.

10. The method according to claim 1, wherein adjacent ends of the first and second conductive traces are interdigitated.

11. The method according to claim 1, further comprising emitting a wireless signal from the antenna of the tag at a third signal characteristic when the tag is not proximate to the active antenna modulation marker, wherein the third signal characteristic comprises a frequency spectrum, a back-scattered amplitude, a signal phase or a signal polarization.

12. A tag system, comprising:
    a tag reader; and
    a tag comprising an antenna and an active antenna modulation marker proximate to the antenna;
    the active antenna modulation marker comprising first and second conductive traces disposed on a substrate connected by a sensor with an impedance responsive to a stimulus for selectively modulating a communications behavior of the tag's antenna;
    wherein the tag is configured to:
        wirelessly communicate a first signal with a first signal characteristic when the sensor is in a high impedance state when exposed to a first stimulus or absent stimulus; and
        wirelessly communicate a second signal with a second signal characteristic when the sensor is in a low impedance state when exposed to a second stimulus that is stronger than the first stimulus, changing an impedance between the first and second conductive traces in response to the second stimulus; and
    wherein the second signal characteristic is different from the first signal characteristic, and none or one of the first or second signal characteristics can result in a signal being unreadable to the tag reader.

13. The system according to claim 12, wherein the first and second signal characteristics comprise frequency spectrums, back-scattered amplitudes, signal phases or signal polarization.

14. The tag system according to claim 12, wherein the stimulus comprises at least one of a change in temperature, a change in moisture, a change in a pH level, a change in pressure, a change in ambient light, a chemical, and vibration.

15. The tag system according to claim 12, wherein the sensor is disposed on the substrate in a gap provided between adjacent ends of the first and second conductive traces.

16. The tag system according to claim 14, wherein the sensor is responsive to the stimulus for closing a gap between the first and second conductive traces to form a low impedance electrical connection.

17. The tag system according to claim 12, wherein the sensor comprises at least one of an electrochemical cell, a piezoelectric sensor, a thermistor, a MEMS switch, and a photo-conductor.

18. The tag system according to claim 12, wherein the sensor has a voltage that changes in response to the stimulus.

19. The tag system according to claim 12, wherein sensor comprises two electrodes and a sensing material disposed adjacent at least one of the two electrodes, a volume of the sensing material expandable in response to the stimulus so as to cause the two electrodes to come in contact with each other.

20. The tag system according to claim 12, wherein the sensor comprises an elongated conductive member connected to the first conductive trace and cantilevered over the second conductive trace by a sensing material, the sensing material changing from a solid to a liquid in response to the stimulus so as to cause the elongated conductive member to come in contact with the second conductive trace.

21. The tag system according to claim 12, wherein adjacent ends of the first and second conductive traces are interdigitated.

22. A tag system, comprising:
a tag reader;
a tag comprising an antenna; and
an active antenna modulation marker that is disposed adjacent to the tag and comprises a sensor configured to sense a stimulus;
wherein the tag is configured to:
wirelessly communicate a signal with a first signal characteristic when the sensor of the active antenna modulation marker is sensing the stimulus; and
wirelessly communicate a signal with a second signal characteristic when the sensor of the active antenna modulation marker no longer senses the stimulus;
wherein at least one of the first signal characteristic and the second signal characteristic comprises a frequency spectrum, a back-scattered amplitude, a signal phase, or a signal polarization; and
wherein the second signal characteristic is different from the first signal characteristic.

\* \* \* \* \*